(12) United States Patent
Young et al.

(10) Patent No.: US 7,058,588 B2
(45) Date of Patent: Jun. 6, 2006

(54) DEPENDENCY-BASED WORK FLOW INTEGRATION AND REDUCTION

(75) Inventors: Kevin W. Young, Tampa, FL (US); Terence Magee, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 1010 days.

(21) Appl. No.: 09/801,366

(22) Filed: Mar. 6, 2001

(65) Prior Publication Data

US 2001/0041999 A1  Nov. 15, 2001

Related U.S. Application Data

(60) Provisional application No. 60/198,915, filed on Apr. 20, 2000, provisional application No. 60/187,481, filed on Mar. 7, 2000.

(51) Int. Cl.
*G06F 17/60* (2006.01)

(52) U.S. Cl. ............................................ 705/8

(58) Field of Classification Search .................... 705/8
See application file for complete search history.

(56) References Cited

U.S. PATENT DOCUMENTS

| | | | |
|---|---|---|---|
| 5,101,340 A | | 3/1992 | Nonaka et al. |
| 5,414,843 A | | 5/1995 | Nakamura et al. |
| 5,530,861 A | * | 6/1996 | Diamant et al. ............... 705/8 |
| 5,563,994 A | * | 10/1996 | Harmon et al. ............. 345/440 |
| 5,729,743 A | * | 3/1998 | Squibb ....................... 707/203 |
| 5,826,237 A | * | 10/1998 | Macrae et al. .................. 705/2 |
| 5,826,252 A | * | 10/1998 | Wolters et al. ................. 707/1 |
| 5,845,270 A | | 12/1998 | Schatz et al. |
| 5,848,394 A | * | 12/1998 | D'Arrigo et al. ............... 705/8 |
| 5,890,130 A | | 3/1999 | Cox et al. |
| 5,907,490 A | | 5/1999 | Oliver |
| 5,960,437 A | | 9/1999 | Krawchuk et al. |
| 5,974,391 A | | 10/1999 | Hongawa |
| 6,101,481 A | * | 8/2000 | Miller ........................... 705/8 |
| 6,460,052 B1 | * | 10/2002 | Thomas et al. ............. 707/203 |

FOREIGN PATENT DOCUMENTS

EP  0 831 398 A1  3/1998

(Continued)

OTHER PUBLICATIONS

Microsoft Project 2000 and Microsoft Project Central Extend Project Management to a Broader Knowledge Worker Audience Microsoft PressPass, Nov. 15, 1999.*

(Continued)

*Primary Examiner*—Tariq R. Hafiz
*Assistant Examiner*—Scott L. Jarrett
(74) *Attorney, Agent, or Firm*—David L. Adour; Fulbright & Jaworski LLP

(57) ABSTRACT

A process and system is disclosed to assist work planners by assembling a work breakdown structure (WBS) and work flow for a project based on the explicit selection or deselection of outcome(s) by a work planner from a defined set of possible outcomes. The process and system ensure that the resulting project WBS and work flow is composed of the minimum set of activities required to produce the set of outcomes desired for the project. The process and system further ensure that the project's activities are organized into an activity hierarchy defined by a WBS template designated by the work planner, and that each of the project's activities is linked into an appropriate work flow, supported by appropriate instructional or descriptive content.

6 Claims, 17 Drawing Sheets

FOREIGN PATENT DOCUMENTS

| | | |
|---|---|---|
| EP | 0 854 431 A2 | 7/1998 |
| JP | 2000-200308 A  * | 7/2000 |

OTHER PUBLICATIONS

Heck, Mike, Project-management software Microsoft Project 2000 extends rearch across enterprise Infoworld, Nov. 15, 1999.*

Howle, Amber, Project 2000 betas now available Computer Reseller News, Nov. 22, 1999, p. 24.*

Courter, Gini et al., Mastering Microsoft Project 2000 Sybex, Mar. 1, 2000, ISBN: 0-7821-2656-1.*

Marnel, Elaine, Microsoft Project 2000 Bible Hungry Minds, Inc., Mar. 2000, ISBN: 0-7645-33193.*

Microsoft Project 2000 Feature Guide (Beta) Microsoft Corporation.*

Duncan, William, A Guide to the Project Management Book of Knowledge Project Management Institute, 1996, ISBN: 1-880410-12-5.*

Krutchen, Phillipe, Rational Unified Process, An Introduction Second Edition, Addison Wesley, Mar. 17, 2000, ISBN: 0-201-70710-1.*

Spence, Bruce A., Integrated Project Numbering Systems American Association of Cost Engineers, 1990.*

Ramsus, Daniel, Project Schedule 4 Scitor Corp.'s project management software MacUser, Jan. 1991, vol. 7, No. 1.*

Mansuy, John, Work Breakdown Structure: A Simple Tool for Complex Jobs Cost Engineering, Dec. 1991, vol. 33, No. 12, pp. 15-18.*

Parviz, F. Rad, Advocating a deliverable-oriented work breakdown structure Cost Engineering, Dec. 1999, vol. 41, No. 12, pp. 35-39.*

Mueller, Stepen E, Resolving Work Breakdown Structure Problems AACE International Transactions, 2000.*

Dewan, Rajiv; Seidmann, Abraham; Walter, Zhiping; Workflow Optimization Through Task Redesign in Business Information Processes; IEEE Proc. 31$^{st}$ Annual Hawaii International conference on System Sciences 1998.

* cited by examiner

| | o | Controlling WBS | Grouping Activity? | Outcome Produced | Predecessors |
|---|---|---|---|---|---|
| 1 | | ⊟ Stage 1 | | | |
| 2 | | ⊟ Phase A | | | |
| 3 | | ⊟ Task A1 | | | |
| 4 | | EA A1.1 | | | |
| 5 | | EA A1.2 | | | 4 |
| 6 | | EA A1.3 | | 01 | 5 |
| 7 | | ⊟ Task A2 | | | |
| 8 | | EA A2.1 | | | 6 |
| 9 | | EA A2.2 | | | 6 |
| 10 | | EA A2.3 | | | 6 |
| 11 | | EA A2.4 | | | 10 |
| 12 | | EA A2.5 | | 02 | 11 |
| 13 | | ⊟ Phase B | | | |
| 14 | | ⊟ Task B1 | | | |
| 15 | | EA B1.1 | | | 0 |
| 16 | | EA B1.2 | | | 15 |
| 17 | | EA B1.3 | | 03 | 16 |
| 18 | | ⊟ Stage 2 | | | |
| 19 | | ⊟ Phase C | | | |
| 20 | | ⊟ Task C1 | | | |
| 21 | | EA C1.1 | Y | | 12, 17 |
| 22 | | EA C1.2 | | | 21 |
| 23 | | EA C1.3 | | 04 | 22 |

Project WBS and Work Flow

| | Project WBS | Grouping Activity? | Outcome Produced | Predecessors | 01 | 02 | 03 | 04 | 05 | 06 | 07 | 08 | 09 | 10 | 11 | 12 |
|---|---|---|---|---|---|---|---|---|---|---|---|---|---|---|---|---|
| 1 | Project WBS | | | | | | | | | | | | | | | |
| 2 | ⊟ Stage 1 | | | | | | | | | | | | | | | |
| 3 | ⊟ Phase B | | | | | | | | | | | | | | | |
| 4 | ⊟ Task B1 | | | | | | | | | | | | | | | |
|   | EA B1.3 | | 03 | | | | | | | | | | | | | |

Notice that all higher-level activities for EA B1.3 have also been inserted into the Project WBS/Work Flow as a result of the Activity Insertion, Positioning, and Content Linking process.

FIG. 5c

Project WBS/Work Flow

| | Project WBS | Grouping Activity? | Outcome Produced | Predecessors | 01 | 02 | 03 | 04 | 05 | 06 | 07 | 08 | 09 | 10 | 11 | 12 |
|---|---|---|---|---|---|---|---|---|---|---|---|---|---|---|---|---|
| 1 | Project WBS | | | | | | | | | | | | | | | |
| 2 | ⊟ Stage 1 | | | | | | | | | | | | | | | |
| 3 | ⊟ Phase B | | | | | | | | | | | | | | | |
| 4 | ⊟ Task B1 | | | | | | | | | | | | | | | |
|   | EA B1.2 | | | | | | | | | | | | | | | |
| 5 | EA B1.3 | | 03 | 4 | | | | | | | | | | | | |

FIG. 5d

Project WBS/Work Flow

| | Project WBS | Grouping Activity? | Outcome Produced | Predecessors | 01 | 02 | 03 | 04 | 05 | 06 | 07 | 08 | 09 | 10 | 11 | 12 |
|---|---|---|---|---|---|---|---|---|---|---|---|---|---|---|---|---|
| 1 | Project WBS | | | | | | | | | | | | | | | |
| 2 | ⊟ Stage 1 | | | | | | | | | | | | | | | |
| 3 | ⊟ Phase B | | | | | | | | | | | | | | | |
| 4 | ⊟ Task B1 | | | | | | | | | | | | | | | |
|   | EA B1.1 | | | | | | | | | | | | | | | |
| 5 | EA B1.2 | | | 4 | | | | | | | | | | | | |
| 6 | EA B1.3 | | 03 | 5 | | | | | | | | | | | | |

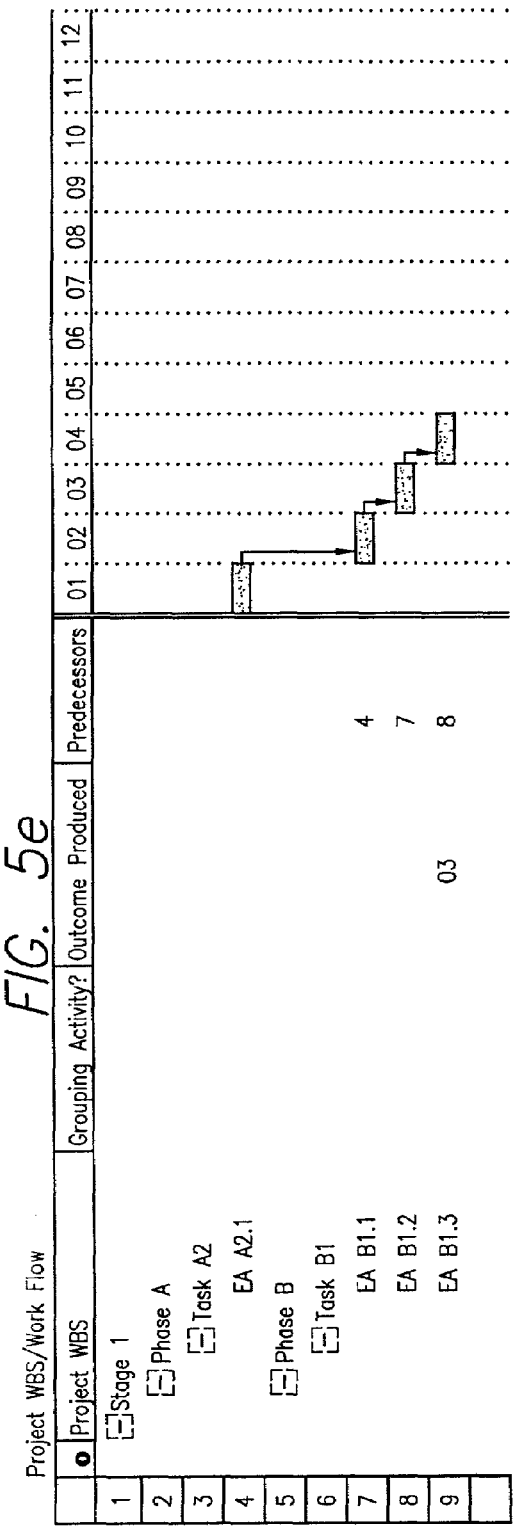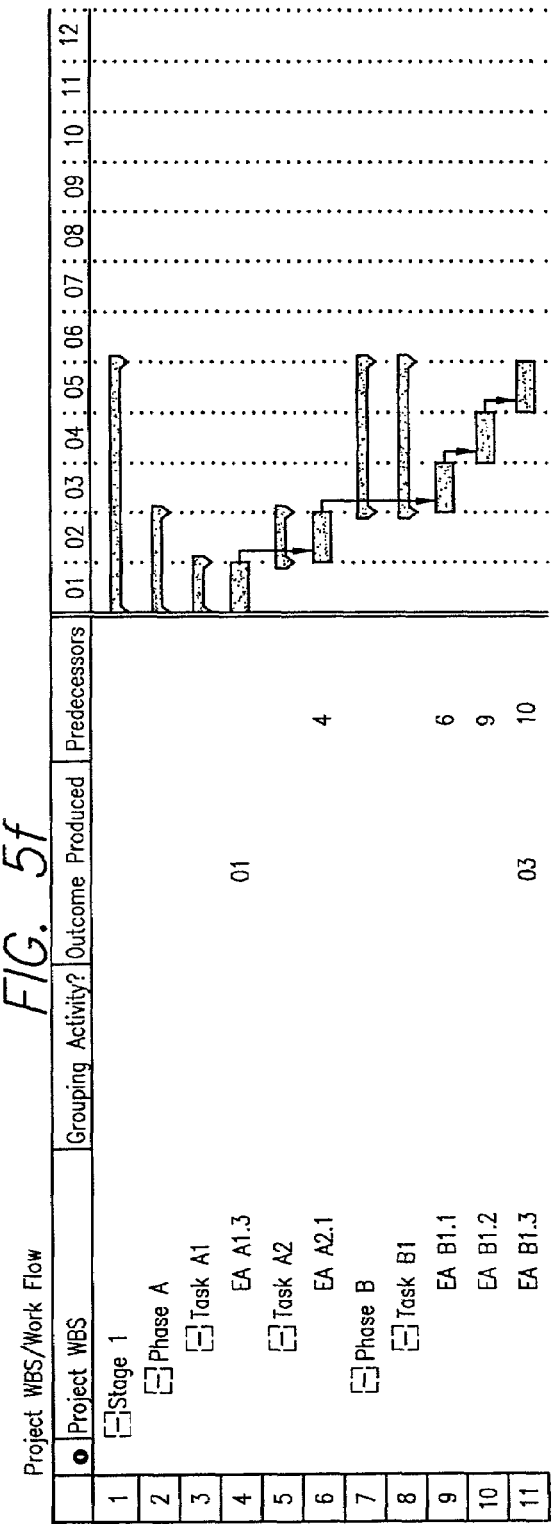

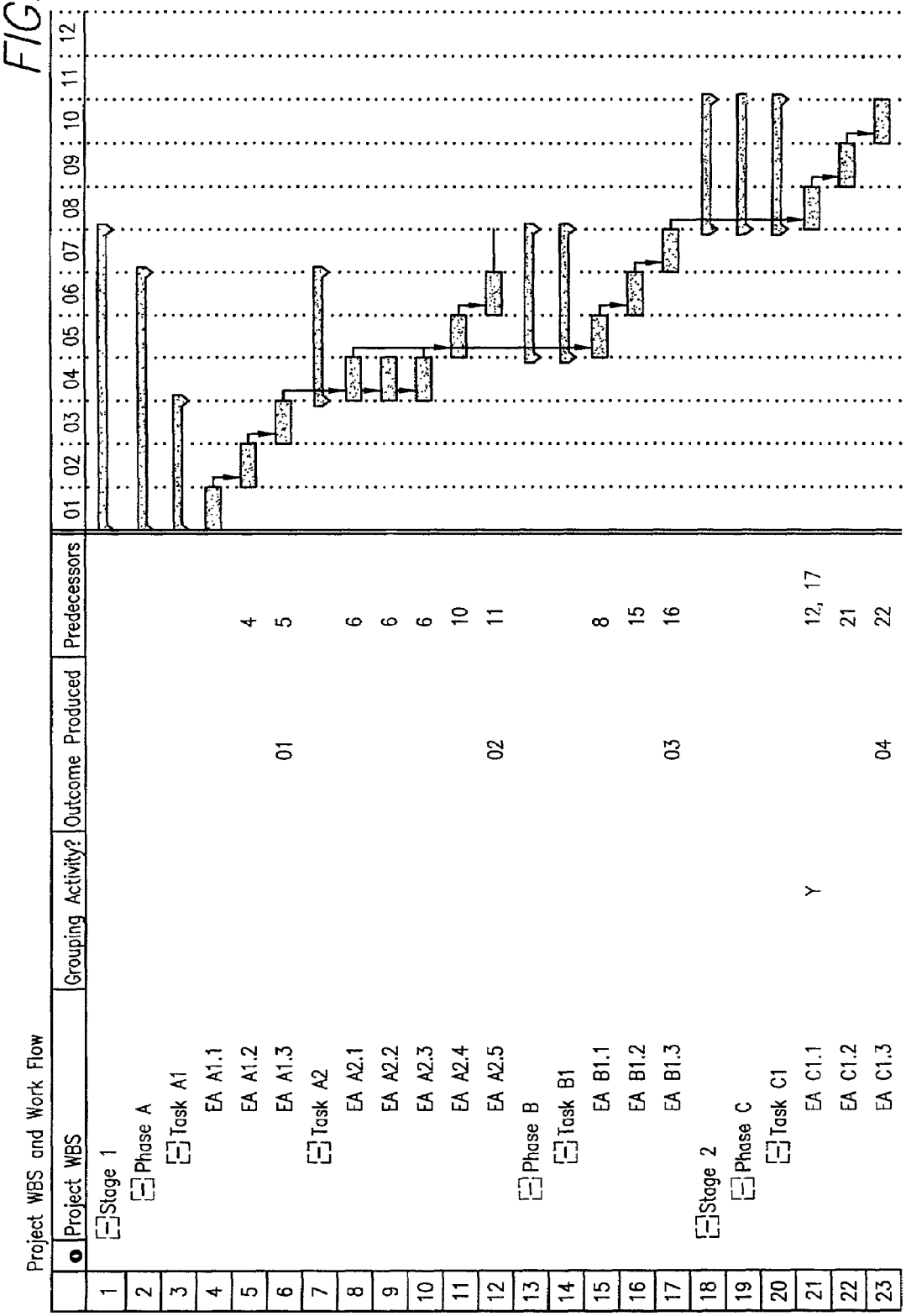

US 7,058,588 B2

DEPENDENCY-BASED WORK FLOW INTEGRATION AND REDUCTION

This application claims the benefit of Provisional Application Nos. 60/187,481 filed on 7 Mar., 2000 and 60/198,915 filed on 20 Apr. 2000.

FIELD OF INVENTION

This invention relates to intelligent project planning and execution and to optimized project planning procedures.

BACKGROUND OF THE INVENTION

Project planning is a discipline focused on determining, structuring, and scheduling the minimum work necessary to produce the outcomes defined for the scope of the project in the least amount of time under known constraints (e.g., resource availability, regulatory requirements, etc.).

Planning complex projects often requires the synthesis, scheduling, and coordination of the activities of many individuals having expertise in distinct disciplines or professions.

In most cases, each discipline or profession will have developed, and formally documented, a body of knowledge that is considered to express its best practices. Generally, each body of knowledge will describe proven and optimal approaches used to achieve specific outcomes associated with the discipline or profession (e.g., the extraction of a wisdom tooth by a dental surgeon, or the design of a user interface for a computer software application by a software engineer).

The approaches described are typically represented in the body of knowledge as a series of interdependent activities.

Combining the activities from more than one body of knowledge into a coherent and optimal whole, as represented by a project work breakdown structure (WBS) and work flow, to satisfy the set of outcomes anticipated by the scope of the project can be daunting, given that the project planner must rationalize, synthesize, and set dependencies between hundreds or thousands of discrete activities from the bodies of knowledge involved, without having the benefit of expertise in all of the disciplines or professions.

SUMMARY OF THE INVENTION

The invention comprises a method, process and system for synthesizing an optimized process flow, an activity abstraction hierarchy and an instruction set that represents the minimal work to produce at least one outcome. An embodiment of this invention utilizes a single set of non-redundant activities and activity dependencies, which has already been derived from an organization's current processes and procedures, to produce an optimized work flow with respect to the desired outcomes for a project. To accomplish this, the conditional execution requirements of each activity required to produce a specified outcome are recursively examined to identify the set of activities which must be completed to arrive at the outcome. Starting with the last of these activities, a determination is made as to whether the activity is already present in the subject project work plan. If the activity is not present, but should be, it is inserted into its correct position in the project's work breakdown structure and is linked into the work flow for each predecessor and successor activity already present in the project's work breakdown structure. Working upstream along the process chain from that identified last activity, the process of activity insertion/positioning and work flow linking continues until all activities in the process chain of the outcome have been considered for insertion. Higher level summary activities are also introduced into the project's work breakdown structure as the lowest-level activities are inserted by referencing a designated work breakdown structure template.

BRIEF DESCRIPTION OF THE DRAWINGS

For a more complete understanding of the present invention, and the advantages thereof, reference is now made to the following descriptions taken in conjunction with the accompanying drawings, in which:

FIG. 5a is an exemplary WBS Template that is populated with sample data that is used as the "controlling WBS" in the examples of the Outcome-Driven Work Flow Synthesis and Reduction Processes;

FIG. 5b is an exemplary project WBS and work flow that is populated with sample data following first execution of step 4.1;

FIG. 5c is an exemplary project WBS and work flow that is populated with sample data following second execution of step 4.1;

FIG. 5d is an exemplary project WBS and work flow that is populated with sample data following third execution of step 4.1;

FIG. 5e is an exemplary project WBS and work flow that is populated with sample data following fourth execution of step 4.1;

FIG. 5f is an exemplary project WBS and work flow that is populated with sample data following fifth execution of step 4.1;

FIG. 7a shows an exemplary project WBS and work flow used as the starting point for Example 3: Outcome-Driven Work Flow Reduction Process (i.e., before the reduction of Outcome O2);

DETAILED DESCRIPTION OF THE PREFERRED EMBODIMENT

Figure 1:
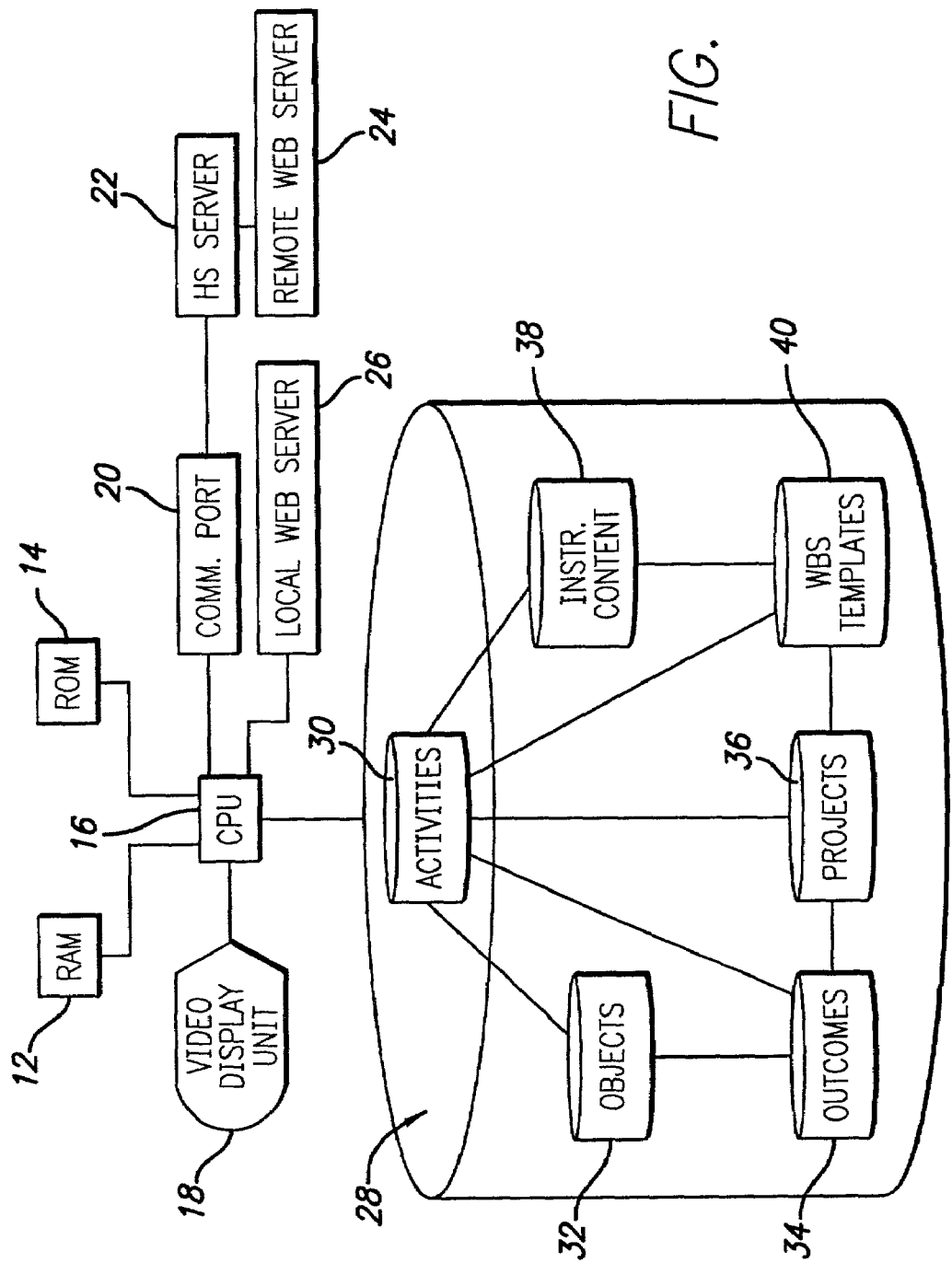
FIG. 1 is a block diagram illustrating an embodiment of the outcome-driven work planning system.

The following description is of the best mode presently contemplated for carrying out the invention. This description is not to be taken in a limiting sense, but is merely made for the purpose of describing the general principles of the invention. The scope of the invention should be determined with reference to the claims.

This mode may be characterized as a rule-based approximation, synthesis, and reduction approach. The planner may start synthesis and reduction with either an empty plan or with a plan that approximates the anticipated final work breakdown structure and work flow required for the scope of the project being planned. The approximation can be chosen from a set of known and useful "stock" plans. A "stock" plan is a previously constructed work breakdown structure (WBS) and work flow (with component activities linked to appropriate instructional content), which have proven useful on past projects. Each stock plan describes the work necessary to achieve one or more outcome. In the synthesis and reduction approach one develops a custom work flow by synthesizing the work flows necessary to achieve desired outcomes not present in the plan and by de-synthesizing, or reducing, the plan's work flows by removing activities that are solely required for outcomes which are currently present in the plan, but which are not wanted.

A process and system is disclosed to assist work planners by assembling a work breakdown structure (WBS) and work flow for a project based on the explicit selection or deselection of outcome(s) by a work planner from a defined set of possible outcomes. The process and system ensure that the resulting project WBS and work flow is composed of the minimum set of activities required to produce the set of outcomes desired for the project.

The process and system further ensure that the project's activities are organized into an activity hierarchy defined by a WBS template designated by the work planner, and that each of the project's activities is linked into an appropriate work flow, supported by appropriate instructional content.

In cases where the projects undertaken require different sets of outcomes, and where the work needed for one outcome may satisfy some or all of the work needed for another outcome, the determination of a rigorously optimized WBS and work flow to produce a desired set of outcomes (where hundreds or thousands of work steps are involved)is not typically feasible.

The present embodiment leverages the manufacturing and information technology principles of interchangeable/reusable components by recognizing that a single, non-redundant set of activities and activity dependencies can be derived from multiple formally documented bodies of knowledge and that this set of activities and activity dependencies can be used to assemble optimized project work breakdown structures (WBSs) and work flows based on the work planner's selection and/or de-selection of outcomes to be achieved by the project being planned.

In this context, an "optimized" WBS and work flow for a project means a WBS and work flow that is composed of the minimum set of activities necessary to produce the set of outcomes desired by the project.

The outcome-driven work flow synthesis process provides a system and method for the work planner or other user to implement the following:
1) View the available WBS templates;
2) View outcomes within and outside of the scope of each WBS template;
3) Choose and transmit a "controlling" WBS template selection;
4) Choose and transmit one or more selected outcome for synthesis;
5) View the resulting WBS and work flow; and
6) Link each activity in the activity hierarchy represented by a project's WBS with the appropriate instructional content.

The outcome-driven work flow reduction process provides a system and method for the work planner or other user to do the following:
1) View the outcomes currently resulting from an existing project's WBS and work flow;
2) Choose and transmit a selected outcome for removal from the WBS and work flow;
3) View the resulting project WBS and work flow.

Taken together, the outcome-driven synthesis and reduction processes provide work planners with the ability to construct and tailor work breakdown structures and work flows, supported by relevant activity descriptions (i.e., instructional content), by simply considering and selecting the outcomes that the project is intended to achieve.

The following terminology is grouped together here as a lexicon for use in describing embodiments of the invention.

Activity—a specific unit of work

Elementary Activity—the smallest unit of work that produces a meaningful result for the project.

Elementary Activity Dependency—An association between two elementary activities such that an execution of the first results in a state, or set of conditions, required by the second. The state resulting from the execution of an elementary activity is called a post-condition. The state required by a dependent elementary activity is called a "pre-condition".

Instructional Content Page—a document (e.g., an HTML document)used to describe the purpose or intent of, and approach to, the conduct of an activity. Each instructional content page may contain formatted text, graphics, and hyperlinks to related instructional content Non-Elementary Activity —a named grouping of lower-level activities (non-elementary or elementary) that serves as an abstraction of its subordinate activities.

Object Class—a type of person, place, thing, concept, event, association, or condition for which information (in the form of attribute values and relationships) may be saved and upon which operations (actions)may be performed.

Outcome—a defined result of a process (e.g., a manufactured part or final product, an architectural drawing, a conceptual model, a decision made, a judgement rendered, a presentation delivered, a state of being achieved).

Project—an organized undertaking to produce or accomplish one or more desired outcome from a set of possible outcomes.

Project Activity—represents the use of an elementary activity or non-elementary activity by a project.

Project Activity Dependency—represents the use of an elementary activity dependency in the workflow for a project.

Project Planning—a discipline focused on determining, structuring, and scheduling the minimum work necessary to produce the outcome(s) defined for the scope of the project in the least amount of time under known constraints (e.g., resource availability, regulatory requirements).

WBS Activity—defines the use and positioning (i.e., vertical positioning and indention level) of an activity in a WBS template.

WBS Template—a named hierarchical structure used as a pattern for organizing project activities into a work breakdown structure (WBS).

Work Breakdown Structure (WBS)— a hierarchy of project activities used to view and manage the work of a project at different levels of abstraction.

Work Flow—a network of interdependent elementary activities that terminates in the elementary activity associated with the production of an outcome.

This workflow development process is designed for use on large-scale projects, including analysis of business strategies, such as where to go with new product development, or reorganization of a large-scale enterprise (e.g. large corporation). Therefore, the results of the workflow development process must be without error and must be capable of handling inputs from disparate sources, e.g., in a corporation, from a research and development unit or division, a manufacturing unit or division, a human resources unit or units, an upper management oversight unit and a reorganization plan (simultaneously with a reorganization of the corporation for carrying out the major project). The workflow development must be done in a manner such that the risk to the enterprise utilizing the work flow development process must be minimized, as well as to the risk to a consulting company providing guidance with its work flow development process. For example, a work plan development process, if it were applied to the development of the B-2 Bomber, would have entailed the reorganization of a corporation to have a whole new large division, staffing such a division, having ongoing research and development input, designing the aircraft with thousands and thousands of specifications and requirements, a manufacturing unit, again with thousands of documented procedures, test units with thousands of tests and test documentation, acceptance tests procedures and manuals for the Air Force. These are extremely complex processes and the costs may be 100's of billions of dollars.

However, it would be desirable to have a system which, in addition to the rule based structure, has an additional element or aspect which allows the work breakdown structure of the flow of the work, in the execution of the project, to be optimized. Now, there are potentially a number of different ways of optimizing the work breakdown structure, that is, the flowcharts detailing how the work needs to be done. In this embodiment, one may start with a previously developed project plan that is considered to be similar to the plan required for the anticipated project. However, the planner may find that desired outcomes are not included in the "stock" plan, and so adds them. That is, one selects one or more outcomes for synthesis. Consequently, the work flow for the selected outcome is synthesized into the current work plan. Similarly, irrelevant outcomes may be present, so the planner subtracts them. Many interdependent elementary activities may be involved in achieving the various outcomes. Adding or removing an outcome requires the readjustment of the project's work flow and work breakdown structure. One may also start with an empty plan, i.e., a plan with no outcomes, and add outcomes to that empty plan.

FIG. 1 shows a computer-based system where RAM 12 and ROM 14 are shown. Other components of a computer-based system are shown including a central processing unit (CPU) 16, a video display unit 18, a communications port 20, an intermediate server 22, a remote web server 24 and a local web server 26. The data storage repository 28 includes Activities 30, Objects 32, Outcomes 34, Projects 36, Instructional Contents 38 and Work Breakdown Structure (WBS) Templates 40.

Figure 2:
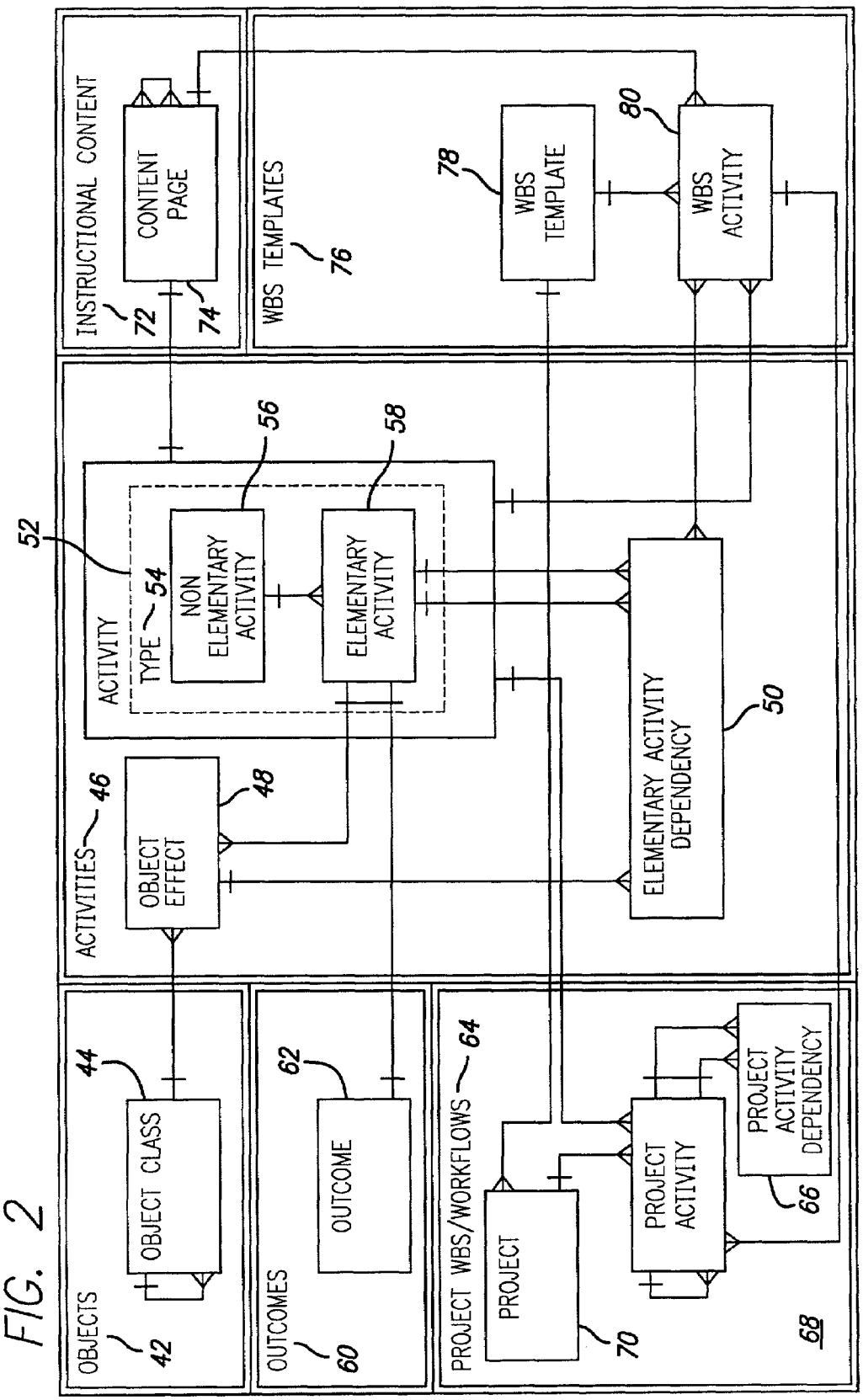
FIG. 2 shows the entity relationship diagram for an embodiment of the planning system data repository.

FIG. 2 shows the Entity Relationship Diagram (ERD) for the Exemplary Planning System Data Repository. Terms having all letters capitalized (e.g., ELEMENTARY ACTIVITY 58) refer to FIG. 2. Definition of terms are listed in the lexicon, above.

The OBJECTS subject area 42 contains OBJECT CLASS 44, which is the subject of one or more OBJECT EFFECT 48 in the ACTIVITIES subject area 46. Each OBJECT EFFECT 48 always results from one ELEMENTARY ACTIVITY 58. Each ELEMENTARY ACTIVITY 58 always is a component of one NON-ELEMENTARY ACTIVITY 56 and may be identified as successor or predecessor on one or more ELEMENTARY ACTIVITY DEPENDENCY 50. In the OUTCOMES subject area 60, each OUTCOME 62 is produced by an ELEMENTARY ACTIVITY 58. In the PROJECT WBS/WORK FLOWS subject area 64, the PROJECT 70 is composed of one or more PROJECT ACTIVITY 68, which may be identified as a predecessor or successor on one or more PROJECT ACTIVITY DEPENDENCY 66. Each PROJECT ACTIVITY 68 may correspond to an ACTIVITY 52 which comprises ELEMENTARY ACTIVITY 58 and NON-ELEMENTARY ACTIVITY 56. The INSTRUCTIONAL CONTENT subject area 72 contains CONTENT PAGE 74 which may be referenced by one or more WBS ACTIVITY 80 which is in the WBS TEMPLATES subject area 76. Each WBS ACTIVITY 80 always references one ACTIVITY 52 and may override one or more ELEMENTARY ACTIVITY DEPENDENCY 50. Each WBS TEMPLATE 78 may provide a controlling WBS for one or more PROJECTS 70.

Outcome-Driven Work Flow Synthesis Process

Figure 3A:
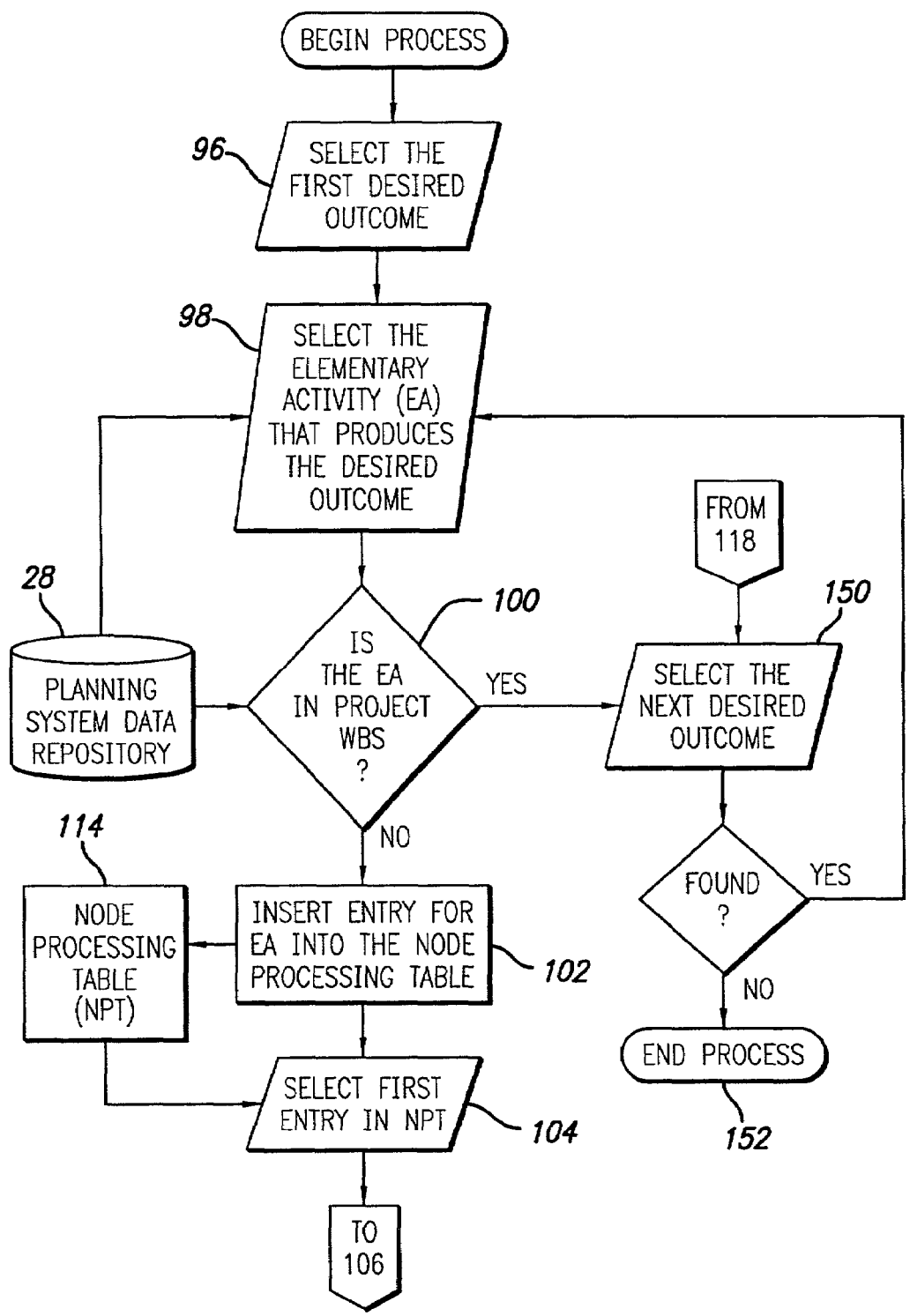
FIG. 3a is a flow chart illustrating the first part of the outcome-driven work flow synthesis process.

This process is initiated when the work planner at step 96 (FIG. 3a) confirms one or more OUTCOMES 62 to be produced/achieved by his or her PROJECT 70. This process will introduce all needed ACTIVITYs 58, 56 into the PROJECT 70, as PROJECT ACTIVITYs 68, to form an appropriate WBS and workflow. Each PROJECT ACTIVITY 68 will also be linked to the INSTRUCTIONAL CONTENT PAGE 74 that is appropriate for the controlling WBS TEMPLATE 78 selected by the Work Planner. The choice of the WBS TEMPLATE 78 sets the context for the PROJECT 70.

For each OUTCOME 62 selected by the Work Planner from the set of possible OUTCOMES 60, perform the following procedures:

Procedure 1: From the Planning Data Repository, at step 98 (FIG. 3a) the ELEMENTARY ACTIVITY 58 is selected that produces the OUTCOME 62 (selected in step 96) the Work Planner wishes to add to his or her PROJECT 70.

The selected ELEMENTARY ACTIVITY 58 will be the last point, or node, in the work flow that results in the OUTCOME 62. The last node 94 in a work flow is commonly referred to as the "terminal", or "most-downstream" node. As an example, where denotes ELEMENTARY ACTIVITY; and of the five ELEMENTARY ACTIVITIES shown, the one furthest downstream, i.e., in the direction indicated by the downstream arrow, is the terminal node 94.

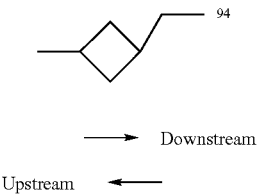

→ Downstream

Upstream ←

Procedure 2: At step 100 (FIG. 3*a*) determine whether the ELEMENTARY ACTIVITY 58 selected in step 98 has already been included in the PROJECT 70 as a PROJECT ACTIVITY 68. If it has been included, then at step 150 select the next desired OUTCOME 62. If it is found, return to step 98. If it is not found, end the process, at step 152. If it has not already been included, insert an entry into the Node Processing Table 114 at step 102 representing the ELEMENTARY ACTIVITY 58, as illustrated in the sample table below, and then continue.

| Entry Seq. # | Node ID | Grouping Indicator | Processed Indicator | Removal Indicator |
| --- | --- | --- | --- | --- |
| 1 | 12387 | N | N | N |

Figure 3B:
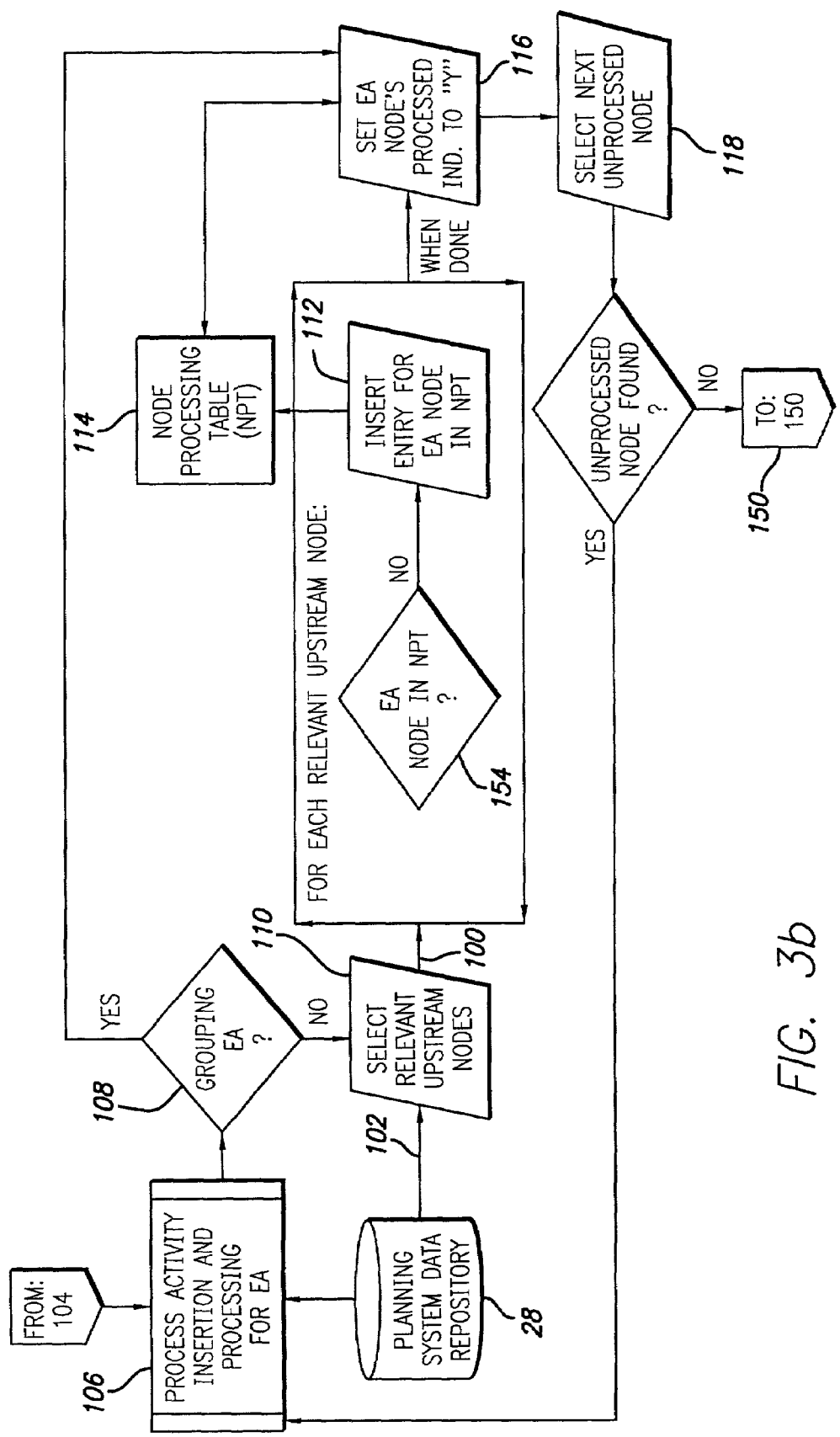
FIG. 3b is a flow chart illustrating the second part of the outcome-driven work flow synthesis process.

The columns in the Node Processing Table (NPT) 114 (FIGS. 3*a*, 3*b*) are defined as follows: "Entry Seq #" records the insertion order, or sequence, of entries (i.e., rows) in the Node Processing Table. "Node ID" records the unique identifier for an ELEMENTARY ACTIVITY 58 that participates as a node in the OUTCOME's 62 workflow. "Grouping Indicator" indicates whether the ELEMENTARY ACTIVITY 58 is classified as a "grouping" activity. A grouping activity is one that collects, or groups, other OUTCOMEs 62. Grouping activities are treated in a specialized way in the Outcome-Driven Work Flow Synthesis Process. "Processed Indicator" indicates whether all processing related to the node has been completed. This column is set to "N" when entries are inserted into the table, and is changed to "Y" when all processing related to the node has been completed. The column "Removal Indicator" is not used for Outcome-Driven Work Flow Synthesis. Instead, this column is used in the Outcome-Driven Work Flow Reduction process. The default value for this column is "N".

Procedure 3:. At step 104 the first entry in the Node Processing Table 114 is selected. As discussed above, this entry will identify the most downstream node 94.

Procedure 4: Perform the following procedures 4.1 through 4.4 (FIG. 3*b*) until all nodes have been processed:

Procedure 4.1: At step 106 (FIG. 3*b*) a PROJECT ACTIVITY 68 record is inserted, corresponding to the ELEMENTARY ACTIVITY 58 referenced by the current node being processed, into the PROJECT 70 by performing the Activity Insertion, Positioning, and Content Linking process (described below).

Procedure 4.2: If the ELEMENTARY ACTIVITY 58 referenced by the current node being processed at step 108 (FIG. 3*b*) is not classified as a "grouping" ELEMENTARY ACTIVITY 58 (i.e., the Grouping Indicator in the Node Processing Table="N"), then at step 110 (FIG. 3*b*) select its relevant upstream nodes. At step 112 (FIG. 3*b*) insert an entry into the Node Processing Table for each relevant upstream node that is not already determined to be in the Node Processing Table 114 at step 154. For purposes of this step a "relevant upstream node" is defined as an ELEMENTARY ACTIVITY 58 that is identified as a predecessor of the ELEMENTARY ACTIVITY 58 referenced by the current node by an instance of ELEMENTARY ACTIVITY DEPENDENCY 50 where the following criteria are satisfied:

(1) If the ELEMENTARY ACTIVITY 58 corresponding to the most downstream node is within the scope of the controlling WBS (i.e., it is referenced by a WBS ACTIVITY 80 that is a component of the controlling WBS TEMPLATE 78) then the candidate predecessor must also be referenced by a WBS ACTIVITY 80 that is a component of the controlling WBS TEMPLATE 78.

This criterion ensures that PROJECT ACTIVITYs 68 included in a PROJECT 70 are limited to those that correspond to an ELEMENTARY ACTIVITY 58 that is explicitly included in the controlling WBS TEMPLATE 78 (i.e., is within the scope boundary established by the controlling WBS TEMPLATE 78).

(2) The ELEMENTARY ACTIVITY DEPENDENCY 50 identifying the candidate predecessor must not be overridden by a WBS ACTIVITY 80 for the controlling WBS TEMPLATE 78 associated with the current node, if one exists; and (3) A PROJECT ACTIVITY 68 corresponding to the candidate predecessor must not already exist for the PROJECT 70.

Procedure 4.3: At step 116 (FIG. 3*b*) set the Processed Indicator for the current node to "Y" in the Node Processing Table. This also pertains to grouping ELEMENTARY ACTIVITIES from step 108.

Procedure 4.4: At 118 select the next unprocessed node in the Node Processing Table (i.e., lowest entry sequence number where the Processed Indicator ="N")-this is referred to as the "current node" in the subsequent steps. If an unprocessed node is found, repeat the processing starting back at step 106. If no unprocessed node is found, then select the next desired outcome (step 150, FIG. 3*a*) and continue according to step 150. Eventually all nodes and all outcomes will be processed and the processing will end.

Activity Insertion, Positioning, and Content Linking

When inserting a PROJECT ACTIVITY 68 into the PROJECT 70 that is within the scope of the controlling WBS TEMPLATE 78, check if a PROJECT ACTIVITY 68 corresponding to its parent WBS ACTIVITY 80 (as defined by the controlling WBS TEMPLATE 78) is already included in the PROJECT 70. If so, position the PROJECT ACTIVITY 68 being inserted one level below its parent in its correct position relative to any of its siblings which are already included in the PROJECT 70. If the parent is not currently included in the PROJECT 70, determine all missing higher-level NON-ELEMENTARY ACTIVITYs 56 based on the PROJECT's 70 controlling WBS TEMPLATE 78. All missing higher-level NON-ELEMENTARY ACTIVITYs 56 must be included in the PROJECT 70 by inserting corresponding PROJECT ACTIVITY's 68 into the PROJECT 70, in their correct relative positions to their siblings. Once all the missing ancestry (i.e., higher-level activities) has been included in the PROJECT 70, insert the PROJECT ACTIVITY 68 that corresponds to the ELEMENTARY ACTIVITY 58 one level below its parent in its correct relative position to any of its siblings which are already included in the PROJECT 70. Link each PROJECT ACTIVITY 68 inserted into the PROJECT 70 to the CONTENT PAGE 74 referenced by the WBS ACTIVITY 80 in the PROJECT's 70 controlling WBS TEMPLATE 78 that references the ACTIVITY 52 corresponding to the inserted PROJECT ACTIVITY 68.

When inserting a PROJECT ACTIVITY 68 into the PROJECT 70 that is not within the scope of the controlling WBS TEMPLATE 78, check if a PROJECT ACTIVITY 68 corresponding to its parent NON-ELEMENTARY ACTIVITY 56 is already included in the PROJECT 70. If so, position the PROJECT ACTIVITY 68 being inserted one level below the PROJECT ACTIVITY 68 corresponding to its parent NON-ELEMENTARY ACTIVITY 56, as the last PROJECT ACTIVITY 68 in that parent (positioning relative to siblings will not be known).

If not, insert both the PROJECT ACTIVITY 68 corresponding to the ELEMENTARY ACTIVITY 58 and a PROJECT ACTIVITY 68 corresponding to its NON-ELEMENTARY ACTIVITY 56 parent to the end of the PROJECT's 70 WBS 78 under a top-level PROJECT ACTIVITY 68 named "Activities to be Manually Positioned".

Create a PROJECT ACTIVITY DEPENDENCY 66 to document each dependency between a PROJECT ACTIVITY 68 inserted into the PROJECT 70 and any of its predecessor and successor PROJECT ACTIVITYs 68 that have already been included in the PROJECT 70, based on any ELEMENTARY ACTIVITY DEPENDENCYs 50 related to the ELEMENTARY ACTIVITY 58 that corresponds to the PROJECT ACTIVITY 68. However, do not create a PROJECT ACTIVITY DEPENDENCY 66 to document a dependency in any case where the ELEMENTARY ACTIVITY DEPENDENCY 50 for the pairing has been overridden by a WBS ACTIVITY 80 that is a component of the PROJECT s 70 controlling WBS TEMPLATE 78.

Outcome-Driven Work Flow Reduction Process

This process is initiated when the work planner chooses to remove an OUTCOME 62 that is currently planned for his or her PROJECT 70. Once initiated, this process will remove any PROJECT ACTIVITYs 68 in the subject OUTCOME's 62 work flow that does not participate in any This process is initiated when the work planner chooses to remove an OUTCOME other planned OUTCOME's 62 work flow currently in the PROJECT 70.

Figure 4A:
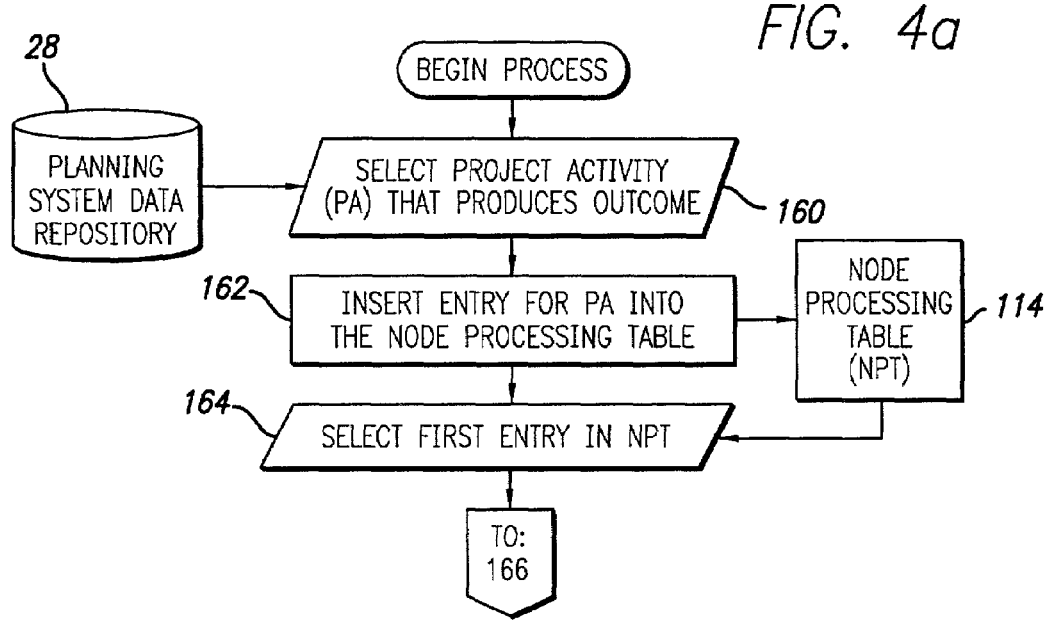
FIG. 4a is a flow chart illustrating the first part of the outcome-driven work flow reduction process.
Figure 4B:
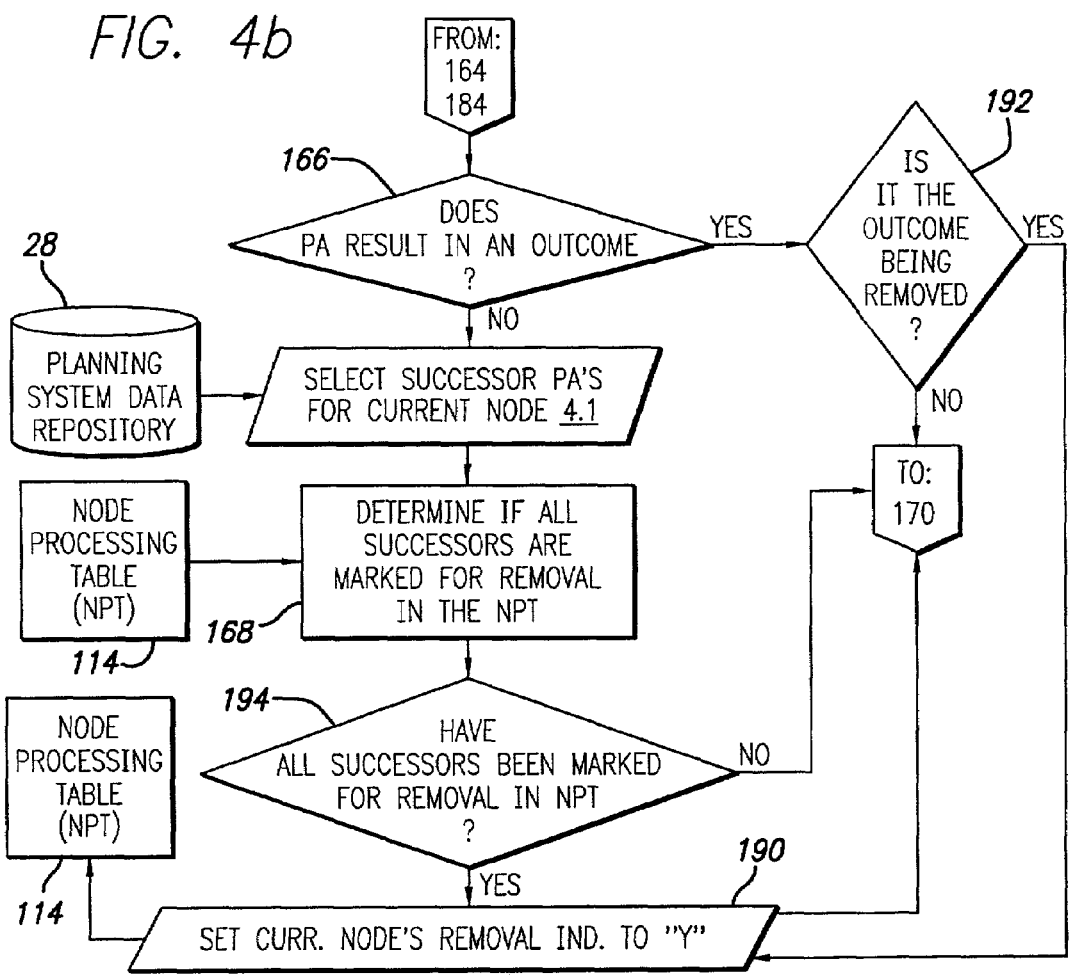
FIG. 4b is a flow chart illustrating the second part of the outcome-driven work flow reduction process.

Procedure 1. From the Planning Data Repository 28, at step 160 (FIG. 4*a*) select the PROJECT ACTIVITY 68 corresponding to the ELEMENTARY ACTIVITY 58 that produces the OUTCOME 62 the work planner wishes to remove from the PROJECT 70.

The selected PROJECT ACTIVITY 68 will be the last point, or node, in the work flow that results in the OUTCOME 62 to be removed. As above, the last node 94 in a work flow is commonly referred to as the "terminal", or "most-downstream" node.

Procedure 2. At step 162 insert an entry into the Node Processing Table 114 (FIG. 4*a*) representing the PROJECT ACTIVITY 68, as illustrated in the sample table below, and then continue with step 164.

| Entry Seq. # | Node ID | Grouping Indicator | Processed Indicator | Removal Indicator |
| --- | --- | --- | --- | --- |
| 1 | 12387 | N | N | N |

The columns in the Node Processing Table (NPT) 114 (FIGS. 3*a*, 3*b*, 4*a*, 4*b*, 4*c*) have already been defined, above.

Procedure 3. At step 164 (FIG. 4*a*) select the first entry in the Node Processing Table 114. As discussed above, this entry will identify the most downstream node 94 (above).

Procedure 4. Perform procedures 4.1 through 4.4 (FIGS. 4*b*, 4*c*) until all nodes have been processed.

Figure 4C:
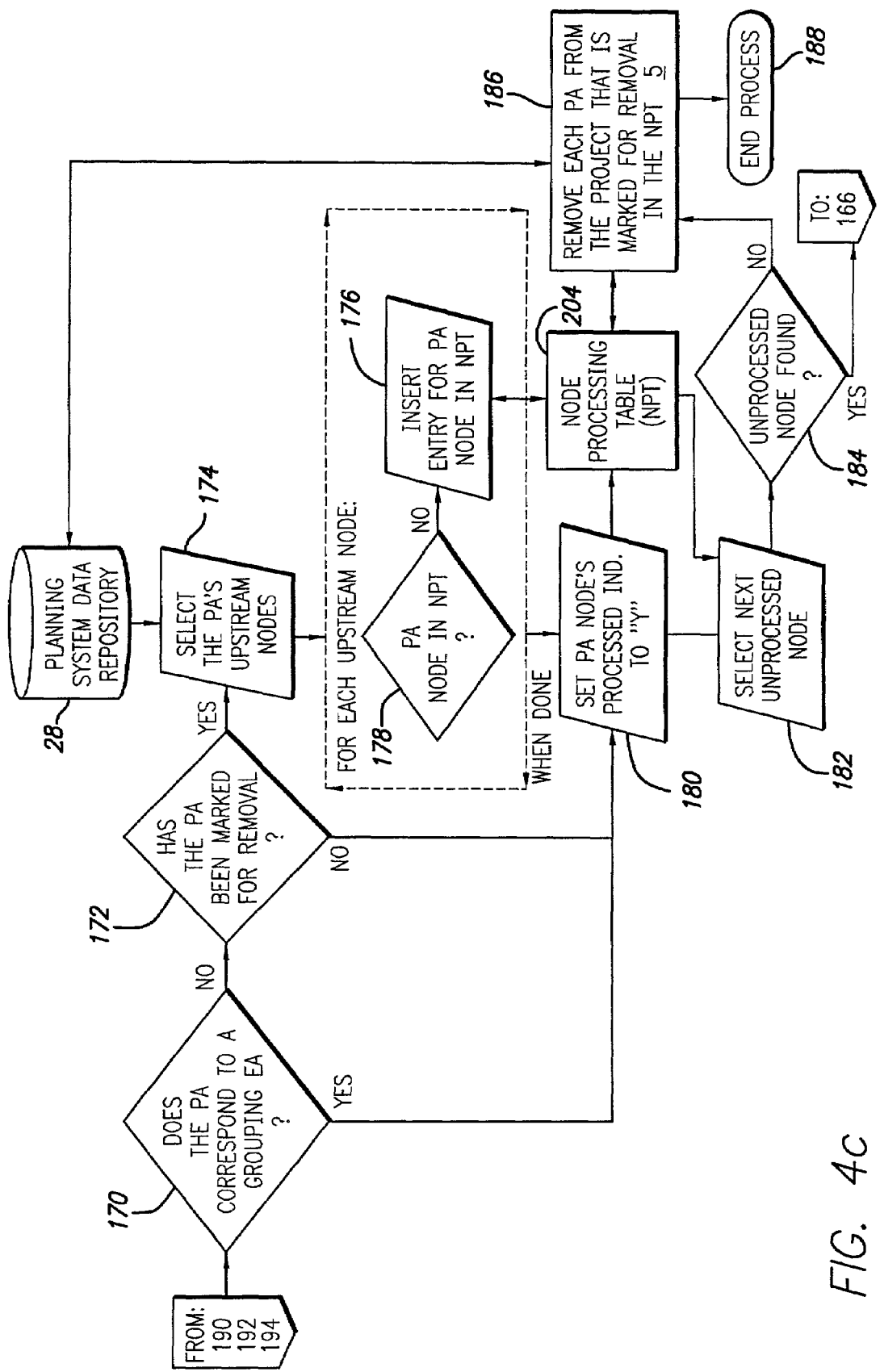
FIG. 4c is a flow chart illustrating shows the third part of the outcome-driven work flow reduction process.

Procedure 4.1: Set the removal Indicator in the Node Processing Table for the current node to "Y" in step 190 if one of the following is true:

(1) The ELEMENTARY ACTIVITY 58, corresponding to the PROJECT ACTIVITY 68, at step 166, identified by the current node, produces an OUTCOME 62, at step 166, which was identified at step 192, as being selected for removal; or (2) The ELEMENTARY ACTIVITY 58 corresponding to the PROJECT ACTIVITY 68 identified by the current node, does not produce an OUTCOME 62 and the PROJECT ACTIVITY 58 does not have any immediate successor PROJECT ACTIVITY's 68 in the PROJECT 70 that have not been marked for removal in the Node Processing Table 114, as determined at step 194. This test insures that a PROJECT ACTIVITY 68 that is part of the work flow of another OUTCOME 62 currently included in the PROJECT 70 does not get removed, as determined at step 194. If all the successors have not been marked for removal in the Node Processing Table 114, the procedure continues to step 170 (FIG. 4*c*).

Procedure 4.2: If the ELEMENTARY ACTIVITY 58 identified by the current node being processed at step 170 (FIG. 4*c*) is not classified as a "grouping" activity and it has been marked at step 172 (FIG. 4*c*) for removal,. At step 174 (FIG. 4*c*) select all of its predecessors according to the PROJECT ACTIVITY DEPENDENCYs 66 and at step 176 (FIG. 4*b*) insert an entry into the Node Processing Table 114 for each selected predecessor that is determined, at step 178, to not already have an entry in the Node Processing Table 114

Procedure 4.3: At step 180 (FIG. 4*c*) set the Processed Indicator for the current node to "Y" in the Node Processing Table 114.

Procedure 4.4: At step 182 select the next unprocessed node in the Node Processing Table (i.e., the lowest entry sequence number where the Processed Indicator"N"). This is now the current node. If an unprocessed node is found at step 184, then return to step 166 (FIG. 4*c*) and continue from that step 166.

Procedure 5: At step 186 remove each PROJECT ACTIVITY 68 corresponding to an ELEMENTARY ACTIVITY 58 that is designated for removal in the Node Processing Table from the PROJECT 70 according to the Activity Removal process. As this removal process proceeds, when removing a PROJECT ACTIVITY 68 from a PROJECT 70, check if it is the last PROJECT ACTIVITY 68 for its parent in the PROJECT's 70 WBS. If so, remove the PROJECT ACTIVITY 68 and its parent from the PROJECT 70. When removing the parent, check if it was the last child for its parent in the PROJECTs 70 WBS. If so, remove it and its parent. Continue this child/parent removal process until a parent PROJECT ACTIVITY 68 that has other children is found or the last ancestor of the current PROJECT ACTIVITY 68 has been removed from the PROJECT 70. The processing ends at step 188.

EXAMPLE 1

Outcome-Driven Work Flow Synthesis Process

For this example, the user has selected one outcome, outcome "O3", for synthesis and has selected the exemplary WBS controlling template shown in FIG. 5*a* as the controlling WBS for the project. The procedures identified below correspond to the numbered procedures in the description of the Outcome-Driven Work Flow Synthesis Process, above.

Procedure 1: Elementary activity EA B1.3 produces the outcome that the user wants to add to the project (i.e., outcome O3), so elementary activity EA B1.3 is selected from the Planning System Data Repository. See FIG. 5*a*.

Procedure 2: Since a project activity corresponding to elementary activity EA B I0.3 has not already been included in the project, an entry is inserted into the Node Processing Table:

| Entry Seq. # | Node ID | Grouping Indicator | Processed Indicator | Removal Indicator |
|---|---|---|---|---|
| 1 | EA B1.3 | N | N | N |

Procedure 3: The first entry is selected (shaded row) in the Node Processing Table.

Sample Node Processing Table-114

| Entry Seq. # | Node ID | Grouping Indicator | Processed Indicator | Removal Indicator |
|---|---|---|---|---|
| 1 | EA B1.3 | N | N | N |

Procedure 4: The results of executing procedures 4.1–4.4 until all entries in the Node Processing Table have been processed are as follows:

Following First Execution of Procedure 4.1

Sample Node Processing Table-114

| Entry Seq. # | Node ID | Grouping Indicator | Processed Indicator | Removal Indicator |
|---|---|---|---|---|
| 1 | EA B1.3 | N | N | N |

Elementary activity EA B1.3 was identified as the elementary activity that produces selected outcome O3. At the conclusion of the first execution of step 4.1 the state of the Node Processing Table is shown above and the Project WBS/Work Flow is shown in FIG. 5*b*.

Following First Execution of Procedure 4.2

Procedure 4.2 identified EA B1.2 as a "relevant" upstream node for the current node (EA B1.3) and inserted an entry reflecting this into the Node Processing Table (below)

Sample Node Processing Table-114

| Entry Seq. # | Node ID | Grouping Indicator | Processed Indicator | Removal Indicator |
|---|---|---|---|---|
| 1 | EA B1.3 | N | N | N |
| 2 | EA B1.2 | N | N | N |

Following First Execution of Procedure 4.3

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | N | N |

Procedure 4.3 set the value of the Processed Indicator cell in the Node Processing Table for the current node to "Y".

Following First Execution of Procedure 4.4

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | N | N |

Procedure 4.4 selected the next unprocessed node in the Node Processing table (selected node is indicated as the shaded row in the Node Processing Table). This action caused node EA B1.2 to become the "current" node.

Following Second Execution of Procedure 4.1

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | N | N |

Procedure 4.1 caused EA B1.2 to be inserted into the Project WBS/Work Flow in its correct position according to the controlling WBS template, and to be linked to its successor, EA B1.3. See FIG. 5*c*.

Following Second Execution of Procedure 4.2

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | N | N |
| 3 | EA B1.1 | N | N | N |

Procedure 4.2 identified EA B 1.1 as a "relevant" upstream node for the current node (EA B1.2) and inserted an entry (Entry Sequence # 3 in the node processing table, above) reflecting this relevant identification into the Node Processing Table.

Following second execution of procedure 4.3

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | N | N |

Procedure 4.3 set the value of the Processed Indicator cell in the Node Processing Table for the current node to "Y".

Following Second Execution of Procedure 4.4

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | N | N |

Procedure 4.4 selected the next unprocessed node in the Node Processing table (selected node is indicated as the shaded row in the Node Processing Table). This action caused node EA B1.1 to become the "current" node.

Processing of procedures 4.1 through 4.4 will continue in the same manner as described above until all relevant upstream nodes have been introduced into the Project WBS/Work Flow according to the Activity Insertion, Positioning, and Content Linking process This example illustrates, below, the internal states of the Node Processing Table and Project WBS/Work Flow for each remaining iteration of 4.4.

Following Third Execution of Procedure 4.1:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | N | N |

See FIG. 5*d* for the Project WBS/Work Flow.

Following Third Execution of Procedure 4.2:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | N | N |
| 4 | EA A2.1 | N | N | N |

Following Third Execution of Procedure 4.3:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | N | N |

Following Third Execution of Procedure 4.4:

Sample Ndoe Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | N | N |

Following Fourth Execution of Procedure 4.1:

Sample Node Processing Table-144

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |

-continued

| Entry Seq. # | Node ID | Grouping Indicator | Processed Indicator | Removal Indicator |
|---|---|---|---|---|
| 3 | EA B1.1 | N | Y | N |
| 4 | EA A2.1 | N | N | N |

FIG. 5e shows the Project WBS/Work Flow at this point in the algorithmic process.

Following Fourth Execution of Procedure 4.2:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | N | N |
| 5 | EA A1.3 | N | N | N |

Following Fourth Execution of Procedure 4.3:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | N | N |

Following Fourth Execution of Procedure 4.4:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | N | N |

Following Fifth Execution of Procedure 4.1:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | N | N |

FIG. 5f shows the Project WBS/Work Flow at this point in the algorithmic process.

Following Fifth Execution of Procedure 4.2:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | N | N |
| 6 | EA A1.2 | N | N | N |

Following Fifth Execution of Procedure 4.3:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | Y | N |
| 6 | EA A1.2 | N | N | N |

Following Fifth Execution of Procedure 4.4:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | Y | N |
| 6 | EA A1.2 | N | N | N |

Following Sixth Execution of Procedure 4.1:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | Y | N |
| 6 | EA A1.2 | N | N | N |

Figure 5G:
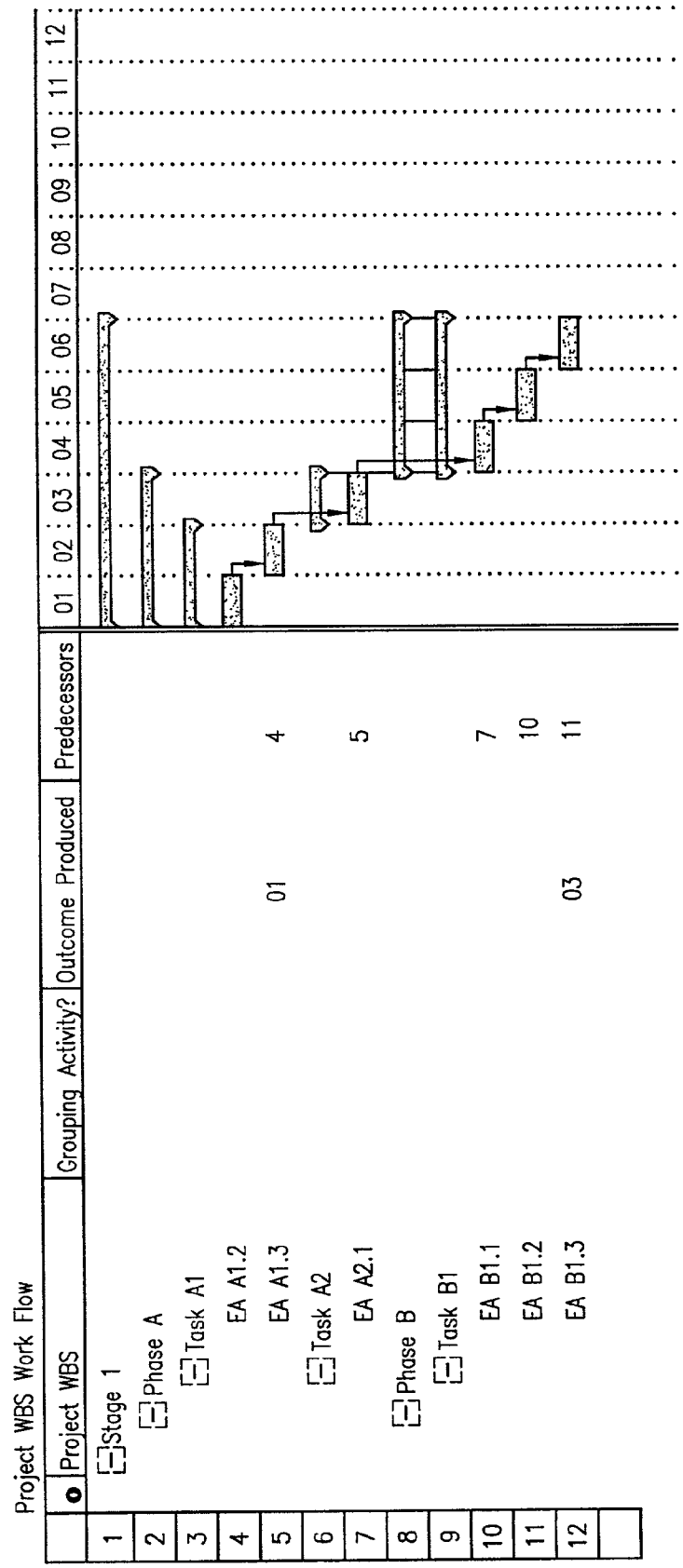
FIG. 5g is an exemplary project WBS and work flow that is populated with sample data following sixth execution of step 4.1.

FIG. 5g shows the Project WBS/Work Flow at this point in the algorithmic process.

Following Sixth Execution of Procedure 4.2:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | Y | N |
| 6 | EA A1.2 | N | N | N |
| 7 | EA A1.1 | N | N | N |

Following Sixth Execution of Procedure 4.3:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | Y | N |
| 6 | EA A1.2 | N | Y | N |
| 7 | EA A1.1 | N | N | N |

Following Sixth Execution of Procedure 4.4:

Sample Node Processing Tale-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | Y | N |
| 6 | EA A1.2 | N | Y | N |
| 7 | EA A1.1 | N | N | N |

Following Seventh Execution of Procedure 4.1:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | Y | N |
| 6 | EA A1.2 | N | Y | N |
| 7 | EA A1.1 | N | N | N |

Figure 5H:
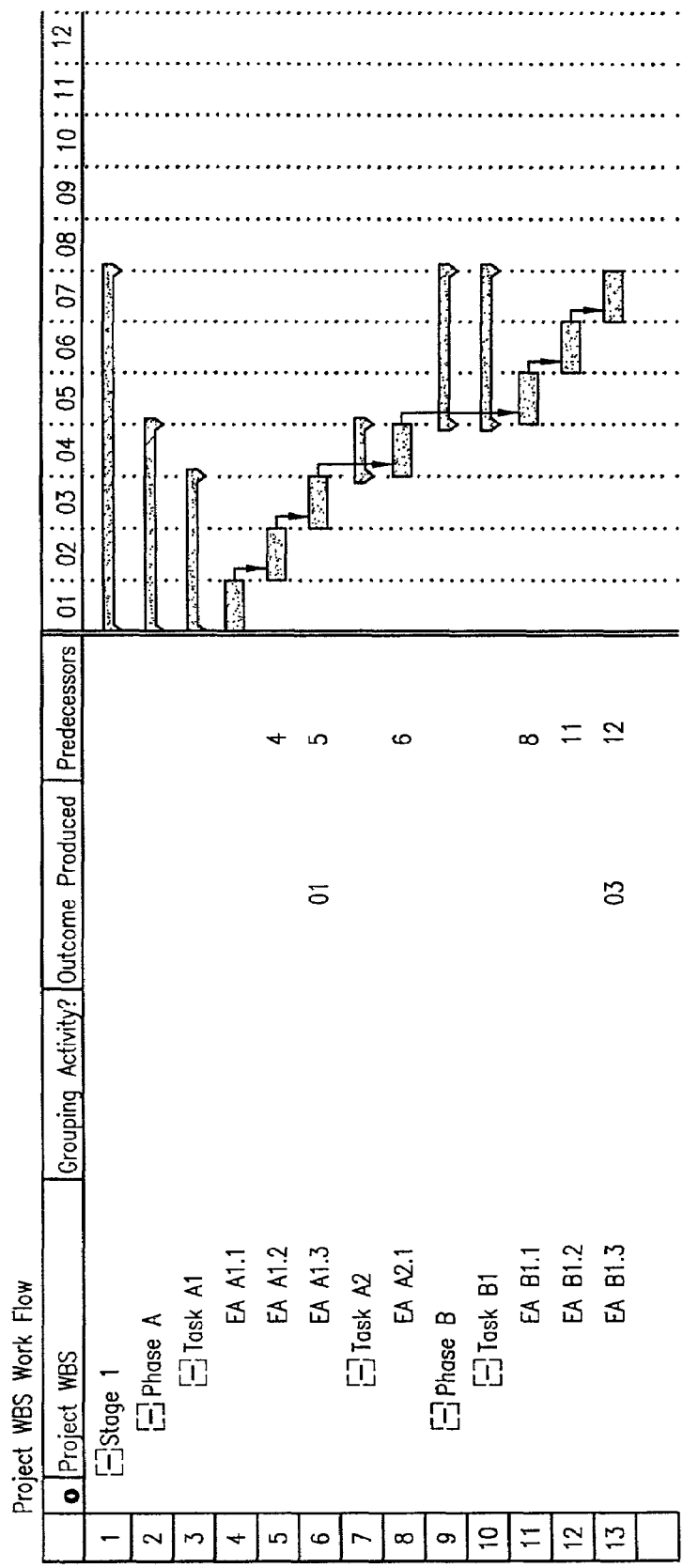
FIG. 5h is an exemplary project WBS and work flow that is populated with sample data following seventh execution of step 4.1.

FIG. 5h shows the Project WBS/Work Flow at this point in the algorithmic process.

Following Seventh Execution of Procedure 4.2:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | Y | N |
| 6 | EA A1.2 | N | Y | N |
| 7 | EA A1.1 | N | N | N |

Following Seventh Execution of Procedure 4.3:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | Y | N |
| 6 | EA A1.2 | N | Y | N |
| 7 | EA A1.1 | N | Y | N |

Following Seventh Execution of Procedure 4.4:

Sample Node Processing Table-114

| Entry Seq. # | Node ID | Grouping Indicator | Processed Indicator | Removal Indicator |
|---|---|---|---|---|
| 1 | EA B1.3 | N | Y | N |
| 2 | EA B1.2 | N | Y | N |
| 3 | EA B1.1 | N | Y | N |
| 4 | EA A2.1 | N | Y | N |
| 5 | EA A1.3 | N | Y | N |
| 6 | EA A1.2 | N | Y | N |
| 7 | EA A1.1 | N | Y | N |

Procedure 4.4 detected no remaining unprocessed nodes in the Node Processing Table. This condition causes the termination of synthetic processing.

EXAMPLE 2 of the Outcome-Driven Work Flow Synthesis Process

Figure 6A:
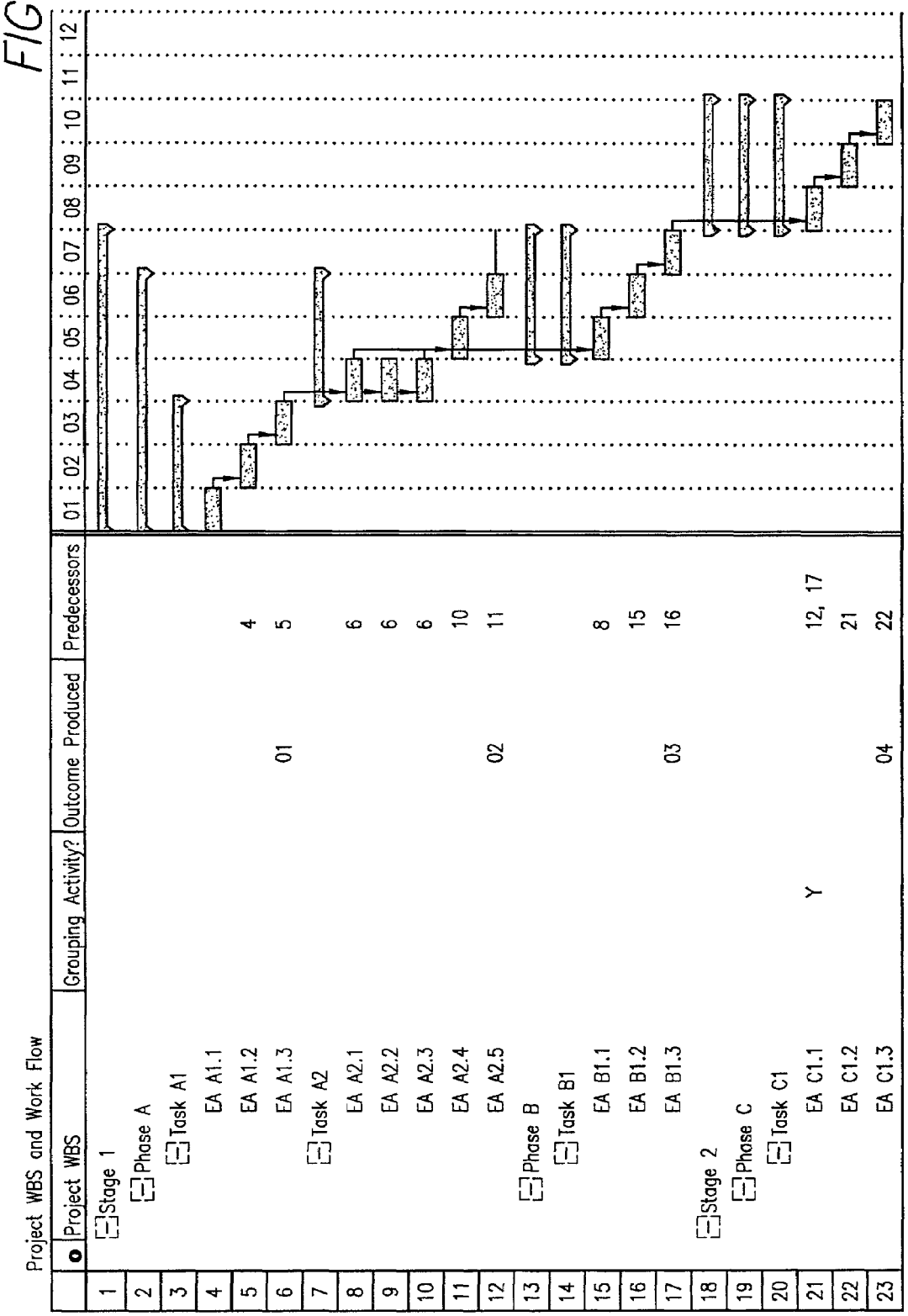
FIG. 6a is an exemplary project WBS and work flow for all outcomes within the scope of the controlling WBS used in examples 1 and 2 of the outcome-driven work flow synthesis process.

In this example, after having selected outcome O3 and seeing the results in the Project WBS/Work Flow from EXAMPLE 1, above, the user decides to add Outcome O4. This illustrates how to synthesize an additional outcome into an existing Project WBS/Work Flow. It also shows the special processing associated with an Elementary Activity classified as a "grouping" activity. The notation follows that of EXAMPLE 1, above. FIG. 6a provides an exemplary Project WBS and work scope of the controlling WBS used for this example.

Procedure 1

Elementary activity EA C 1.3 produces the outcome that the user (work planner) wants to add to the project (i.e., Outcome O4), so it is selected from the Planning System Data Repository 28 (FIG. 1).

Procedure 2

Since a project activity corresponding to elementary activity EA C 1.3 has not already been included in the project, an entry is inserted into the Node Processing Table as follows:

Sample Node Processing Table-114

| Entry Seq. # | Node ID | Grouping Indicator | Processed Indicator | Removal Indicator |
|---|---|---|---|---|
| 1 | EA C1.3 | N | N | N |

Procedure 3

The first entry is selected in the Node Processing Table. This is illustrated by the shading the entry in the exemplary Node Processing Table as follows:

Sample Node Processing Table-114

| Entry Seq. # | Node ID | Grouping Indicator | Processed Indicator | Removal Indicator |
|---|---|---|---|---|
| 1 | EA C1.3 | N | N | N |

Procedure 4

The results of executing procedures 4.1–4.4 until all entries in the Node Processing Table have been processed are as follows:

Following First Execution of Procedure 4.1:

Sample Node Processing Table-114

| Entry Seq. # | Node ID | Grouping Indicator | Processed Indicator | Removal Indicator |
|---|---|---|---|---|
| 1 | EA C1.3 | N | N | N |

Figure 6B:
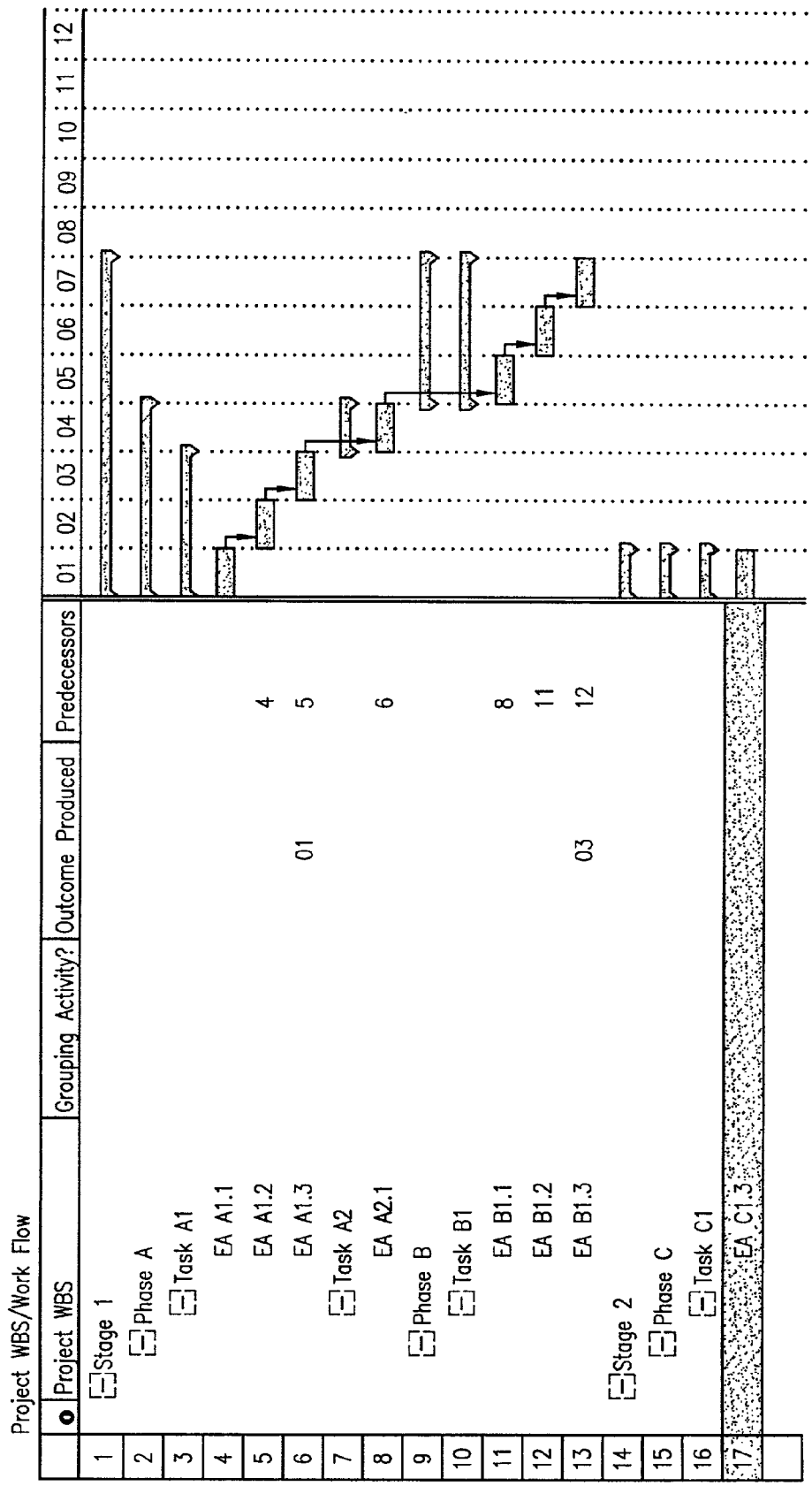
FIG. 6b is an exemplary project WBS and work flow that is populated with sample data following first execution of step 4.1.

Elementary activity EA C1.3 was identified as the elementary activity that produces the selected outcome O4. At the conclusion of the first execution of procedure 4.1 the state of the Node Processing Table and Project WBS/Work Flow is as shown above and on FIG. 6b.

Following First Execution of Procedure 4.2:

Sample Node Processing Table-114

| Entry Seq. # | Node ID | Grouping Indicator | Processed Indicator | Removal Indicator |
|---|---|---|---|---|
| 1 | EA C1.3 | N | N | N |
| 2 | EA C1.2 | N | N | N |

Procedure 4.2 identified EA C1.2 as a "relevant" upstream node for the current node (EA C1.3) and inserted an entry reflecting this into the Node Processing Table.

Following First Execution of Procedure 4.3:

Sample Node Processing Table-114

| Entry Seq. # | Node ID | Grouping Indicator | Processed Indicator | Removal Indicator |
|---|---|---|---|---|
| 1 | EA C1.3 | N | Y | N |
| 2 | EA C1.2 | N | N | N |

Procedure 4.3 set the value of the Processed Indicator cell in Node Processing Table for the current node to "Y".

Following First Execution of Procedure 4.4:

Sample Node Processing Table-114

| Entry Seq. # | Node ID | Grouping Indicator | Processed Indicator | Removal Indicator |
|---|---|---|---|---|
| 1 | EA C1.3 | N | Y | N |
| 2 | EA C1.2 | N | N | N |

Procedure 4.4 selected the next unprocessed node in the Node Processing Table (selected node is indicated as the shaded row in the Node Processing Table). This action caused node EA C1.2 to become the "current" node.

Following Second Execution of Procedure 4.1:

Sample Node Processing Table-114

| Entry Seq. # | Node ID | Grouping Indicator | Processed Indicator | Removal Indicator |
|---|---|---|---|---|
| 1 | EA C1.3 | N | Y | N |
| 2 | EA C1.2 | N | N | N |

Figure 6C:
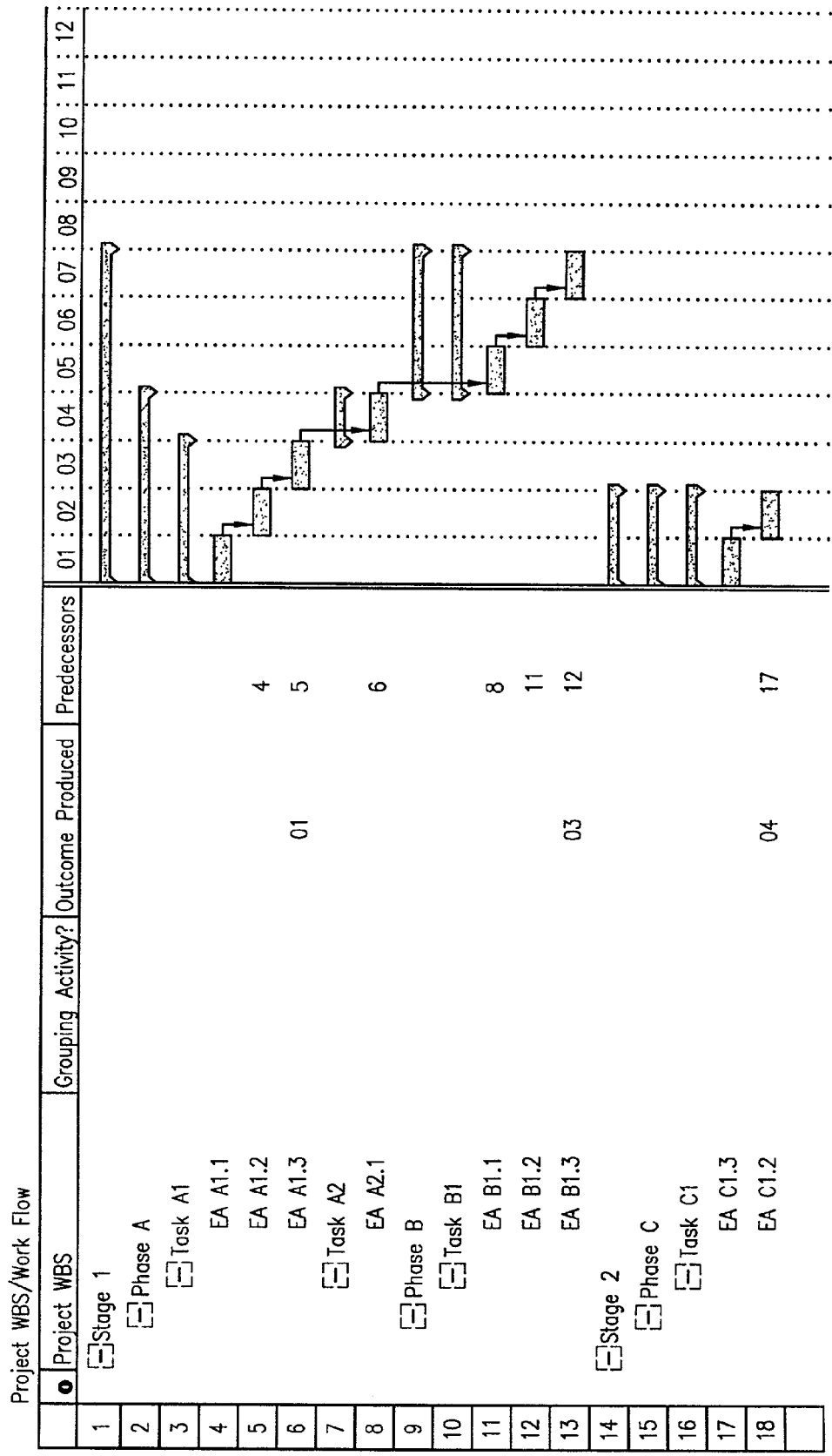
FIG. 6c is an exemplary project WBS and work flow that is populated with sample data following second execution of step 4.1.
Figure 6D:
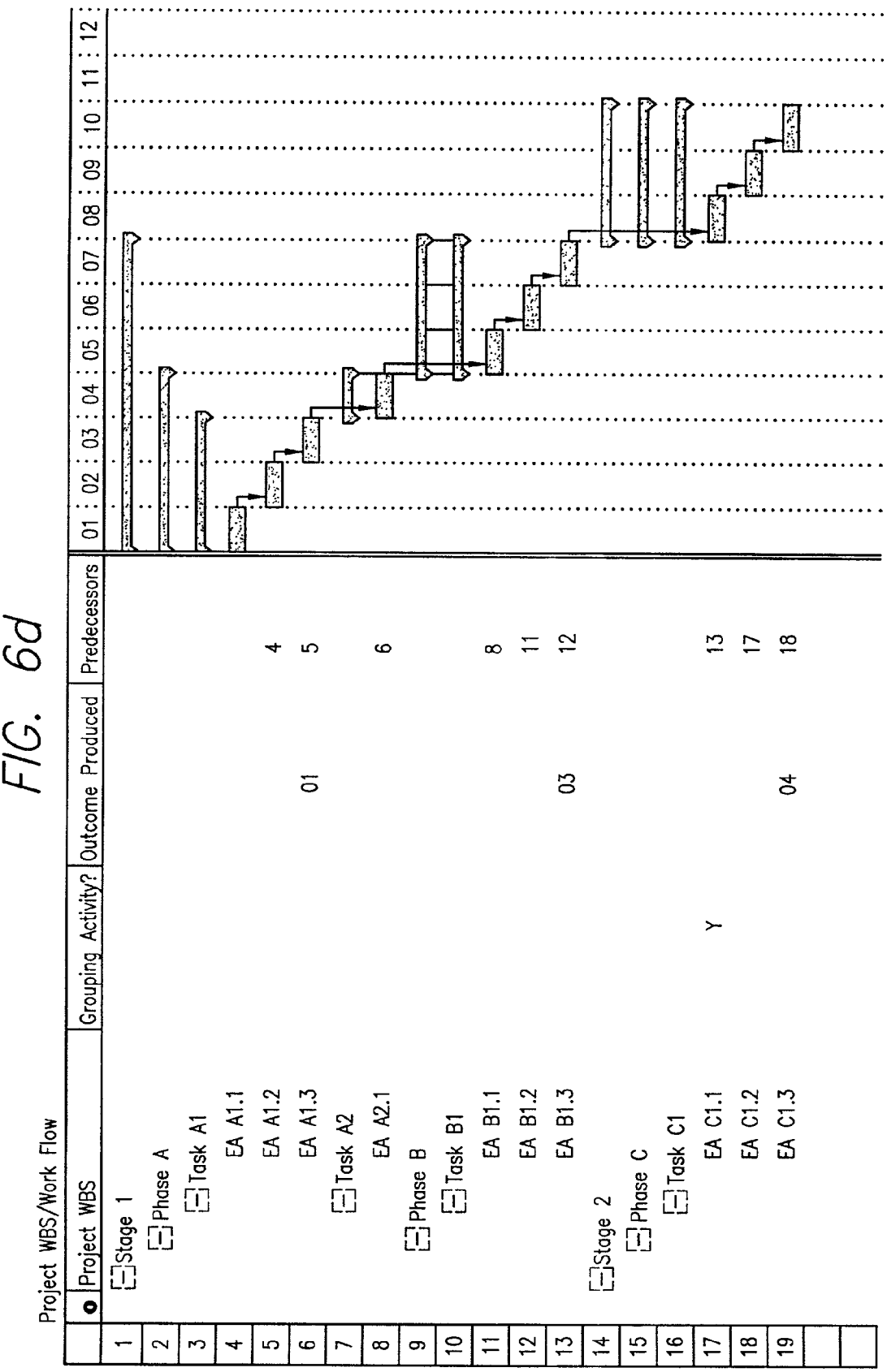
FIG. 6d is an exemplary project WBS and work flow that is populated with sample data following third execution of step 4.1.

Procedure 4.1 caused EA C1.2 to be inserted into the Project WBS/Work Flow in its correct position according to the Controlling WBS TEMPLATE, and to be linked to its successor, EA C1.3. Since none of EA C1.3's predecessors are present in the Project WBS/Work Flow, it could not be linked to its predecessors at this Point. See FIG. 6c.

Following Second Execution of Procedure 4.2:

Sample Node Processing Table-114

| Entry Seq. # | Node ID | Grouping Indicator | Processed Indicator | Removal Indicator |
|---|---|---|---|---|
| 1 | EA C1.3 | N | Y | N |
| 2 | EA C1.2 | N | N | N |
| 3 | EA C1.1 | Y | N | N |

Procedure 4.2 identified EA C1.1 as a "relevant" upstream node for current node (EA C1.2) and inserted an entry reflecting this into the Node Processing Table.

Following Second Execution of Procedure 4.3:

Sample Node Processing Table-114

| Entry Seq. # | Node ID | Grouping Indicator | Processed Indicator | Removal Indicator |
|---|---|---|---|---|
| 1 | EA C1.3 | N | Y | N |
| 2 | EA C1.2 | N | Y | N |
| 3 | EA C1.1 | Y | N | N |

Procedure 4.3 set the value of the Processed Indicator cell in the Node Processing Table for the current node to "Y".

Following Second Execution of Procedure 4.4:

Sample Node Processing Table-114

| Entry Seq. # | Node ID | Grouping Indicator | Processed Indicator | Removal Indicator |
|---|---|---|---|---|
| 1 | EA C1.3 | N | Y | N |
| 2 | EA C1.2 | N | Y | N |
| 3 | EA C1.1 | Y | N | N |

Procedure 4.4 selected the next unprocessed node in the Node Processing table (selected node is indicated as the shaded row in the Node Processing Table). This action caused node EA C 1.1 to become the "current" node.

Following Third Execution of Procedure 4.1:

Sample Node Processing Table-114

| Entry Seq. # | Node ID | Grouping Indicator | Processed Indicator | Removal Indicator |
|---|---|---|---|---|
| 1 | EA C1.3 | N | Y | N |
| 2 | EA C1.2 | N | Y | N |
| 3 | EA C1.1 | Y | N | N |

Procedure 4.1 caused EA C1.1 to be inserted into the Project/WBS Work Flow in its correct position according to the Controlling WBS Template, and to be linked to its successor, EA C1.2 and to its predecessor, EA B1.3. See FIG. 6

Following Third Execution of Procedure 4.2:

Sample Node Processing Table-114

| Entry Seq. # | Node ID | Grouping Indicator | Processed Indicator | Removal Indicator |
|---|---|---|---|---|
| 1 | EA C1.3 | N | Y | N |
| 2 | EA C1.2 | N | Y | N |
| 3 | EA C1.1 | Y | N | N |

Procedure 4.2 detected that EA C1.1 was a "Grouping" activity and, as a result, did not attempt identification of relevant upstream nodes. No entries were inserted into the Node Processing Table and EA C1.1 remains the current node Following Third Execution of Procedure 4.3:

Sample Node Processing Table-114

| Entry Seq. # | Node ID | Grouping Indicator | Processed Indicator | Removal Indicator |
|---|---|---|---|---|
| 1 | EA C1.3 | N | Y | N |
| 2 | EA C1.2 | N | Y | N |
| 3 | EA C1.1 | Y | Y | N |

Procedure 4.3 set the value of the Processed Indicator cell in Node Processing Table for the current node to "Y".

Following Third Execution of Procedure 4.4:

Sample Node Processing Table-114

| Entry Seq. # | Node ID | Grouping Indicator | Processed Indicator | Removal Indicator |
|---|---|---|---|---|
| 1 | EA C1.3 | N | Y | N |
| 2 | EA C1.2 | N | Y | N |
| 3 | EA C1.1 | Y | Y | N |

Procedure 4.4 detected no remaining unprocessed nodes in the Node Processing Table. This condition causes the termination of synthesis processing.

EXAMPLE 3

Outcome-Driven Work Flow Reduction Process

Procedure 1

Project activity EA A2.5 produces the outcome that the user (work planner) wishes to remove from the project (i.e., O2), so it is selected from the Planning System Data Repository.

Procedure 2

An entry is inserted into the Node Processing Table as follows:

Sample Node Processing Table-114

| Entry Seq. # | Node ID | Grouping Indicator | Processed Indicator | Removal Indicator |
|---|---|---|---|---|
| 1 | EA A2.5 | N | N | N |

Procedure 3

The first entry is selected in the Node Processing Table (shaded).

Sample Node Processing Table-114

| Entry Seq. # | Node ID | Grouping Indicator | Processed Indicator | Removal Indicator |
|---|---|---|---|---|
| 1 | EA A2.5 | N | N | N |

Procedure 4

Procedures 4.1 through 4.4 are executed until all entries in the Node Processing Table have been processed.

Following First Execution of Procedure 4.1:

Sample Node Processing Table-114

| Entry Seq. # | Node ID | Grouping Indicator | Processed Indicator | Removal Indicator |
|---|---|---|---|---|
| 1 | EA A2.5 | N | N | Y |

Project activity EA A2.5 was identified as the activity that produces selected outcome O2. At the conclusion of the first execution of procedure 4.1 the state of the Node Processing Table is as shown.

Procedure 4.1 set the Removal Indicator for the current node to "Y" because the project activity identified by the current node produces the outcome selected for removal.

Following First Execution of Procedure 4.2:

Sample Node Processing Table-114

| Entry Seq. # | Node ID | Grouping Indicator | Processed Indicator | Removal Indicator |
|---|---|---|---|---|
| 1 | EA A2.5 | N | N | Y |
| 2 | EA A2.4 | N | N | N |

Procedure 4.2 identified EA A2.4 as a predecessor to the current node (EA A2.5) according to the project activity dependencies, and inserted an entry reflecting this into the Node Processing Table Following First Execution of Procedure 4.3:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | N | N |

Procedure 4.3 set the value of the Processed Indicator of the current node in the Node Processing Table to "Y".

Following First Execution of Procedure 4.4:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | N | N |

Procedure 4.4 selected the next unprocessed node in the Node Processing Table (selected node is indicated as the shaded row in the Node Processing Table). This action caused the node EA A2.4 to become the "current" node.

Following Second Execution of Procedure 4.1:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | N | Y |

Procedure 4.1 set the Removal Indicator for the current node to "Y" because the project activity identified by the current node does not produce an outcome and does not have any immediate successors in the Project WBS/Work Flow that have not been marked for removal in the Node Processing Table (EA A2.5 is its only successor and EA A2.5 has been marked for removal in the Node Processing Table).

Following Second Execution of Procedure 4.2:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | N | Y |
| 3 | EA A2.3 | N | N | N |

Procedure 4.2 identified EA A2.3 as a predecessor to the current node (EA A2.4) according to Project Activity Dependencies, and inserted an entry reflecting this into the Node Processing Table.

Following Second Execution of Procedure 4.3:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | Y | Y |
| 3 | EA A2.3 | N | N | N |

Procedure 4.3 set the value of the Processed Indicator of the current node in the Node Processing Table to "Y".

Following Second Execution of Procedure 4.4:

Sample Node Processign Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | Y | Y |
| 3 | EA A2.3 | N | N | N |

Procedure 4.4 selected the next unprocessed node in the Node Processing Table (shaded row). Thus EA A2.3 becomes the current node.

Following Third Execution of Procedure 4.1:

Sample node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | Y | Y |
| 3 | EA A2.3 | N | N | Y |

Procedure 4.1 sets the Removal Indictor to "Y" because the project activity identified by the current node does not produce an outcome. It does not have any immediate successors in the Project WBS/Work Flow that have not been marked for removal in the Node Processing table. EA A2.4 is its only successor and it has already been marked for removal.

Following Third Execution of Procedure 4.2:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | Y | Y |
| 3 | EA A2.3 | N | N | Y |
| 4 | EA A1.3 | N | N | N |

Procedure 4.2 identified EA A1.3 as a predecessor to the current node (EA A2.3) according to the project activity dependencies and therefore inserted an entry into the Node Processing Table.

Following Third Execution of Procedure 4.3:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | Y | Y |
| 3 | EA A2.3 | N | Y | Y |
| 4 | EA A1.3 | N | N | N |

Procedure 4.3 set the value of the Processed Indicator for the current node being processed to "Y".

Following Third Execution of Procedure 4.4:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | Y | Y |
| 3 | EA A2.3 | N | Y | Y |
| 4 | EA A1.3 | N | N | N |

Procedure 4.4 selected the next unprocessed node (shaded) so that EA A1.3 is the current node.

Following Fourth of Procedure 4.1:

Sample Node processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | Y | Y |
| 3 | EA A2.3 | N | Y | Y |
| 4 | EA A1.3 | N | N | N |

Procedure 4.1 does not set the Removal Indicator for the current mode to "Y" because the project activity identified by the current mode has immediate successors in the Project WBS/Work Flows that have not been marked for removal in the Node Processing Table (i.e., EA A2.1 and EA A2.2).

Following Fourth of Procedure 4.2:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | Y | Y |
| 3 | EA A2.3 | N | Y | Y |
| 4 | EA A1.3 | N | N | N |

Procedure 4.2 does not insert entries into the Node Removal Table for EA A1.3's predecessors because EA A1.3 has not been marked for removal.

Following Fourth of Procedure 4.3:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | Y | Y |
| 3 | EA A2.3 | N | Y | Y |
| 4 | EA A1.3 | N | Y | N |

Procedure 4.3 set the value of the Processed Indicator for the current node in the Node Processing Table to "Y".

Following Fourth of Procedure 4.4:

Sample Node Processing Table-114

| Entry Seq. # | Node ID | Grouping Indicator | Processed Indicator | Removal Indicator |
|---|---|---|---|---|
| 1 | EA A2.5 | N | Y | Y |
| 2 | EA A2.4 | N | Y | Y |
| 3 | EA A2.3 | N | Y | Y |
| 4 | EA A1.3 | N | Y | N |

Figure 7B:
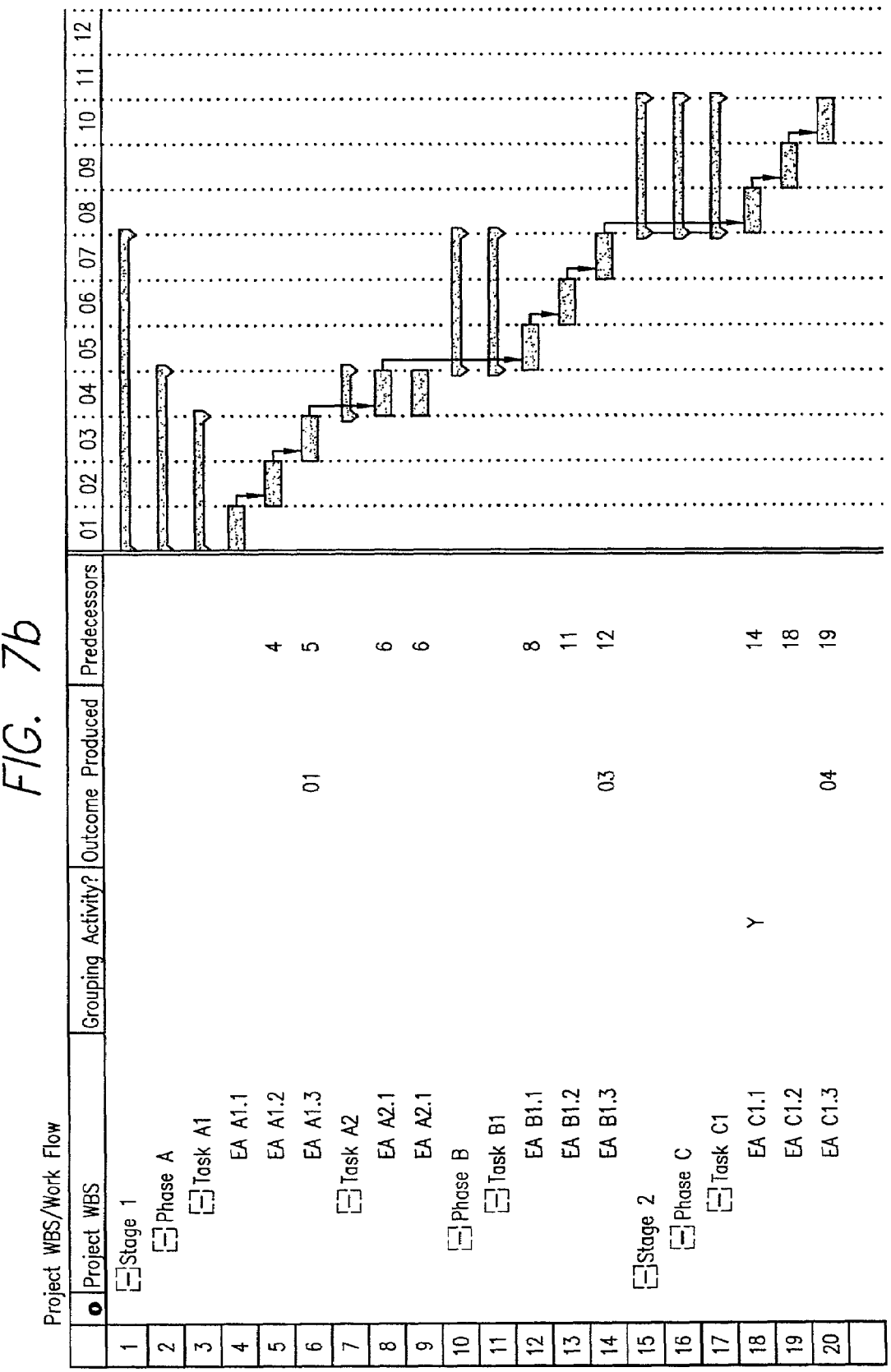
FIG. 7b shows an exemplary project WBS and work flow resulting from the execution of procedure 5 from Example 3: Outcome-Driven Work Flow Reduction Process.

Procedure 4.4 detected no remaining unprocessed nodes in the Node Processing Table. This condition causes the termination of procedure 4's iteration. Processing proceeds with procedure 5 which is the deletion of nodes marked for removal. See FIG. 7*b*.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computerized process for generating an integrated project work breakdown structure (WBS) and related work flows, comprising the steps of:
   (a) selecting an existing project WBS, said existing project WBS having related work flows;
   (b) selecting at least one desired outcome for synthesis, said at least one selected desired outcome having a first associated work flow comprising a network of interdependent activities; and
   (c) integrating said first associated work flow with said existing project WBS and its related work flows by:
      (c1) automatically identifying the most downstream activity in said first associated work flow;
      (c2) automatically determining whether each activity in said first associated work flow is already present in the project WBS and related work flows being generated by starting with the most downstream activity in said first associated work flow and working upstream until all activities in said first associated work flow have been compared to the activities of the project WBS and related work flows being generated;
      (c3) automatically adding any activity in said first associated work flow which is not already present in the project WBS and related work flows being generated;
      (c4) automatically adding activity dependencies which should exist between any of said added activities and any activity already present in the project WBS and related work flows being generated; and
      (c5) automatically introducing summary activities, when required, into the project WBS being generated when lowest-level activities from said first associated work flow are added.

2. The process of claim 1, further comprising the steps of:
   (d) selecting at least one undesired outcome for reduction, said at least one selected undesired outcome having a second associated work flow comprising a network of interdependent activities; and
   (e) reduction of said second associated work flow from the integrated project WBS and related work flows being generated by:
      (e1) automatically identifying the most downstream activity in said second associated work flow;
      (e2) automatically determining whether each activity in said second associated work flow is also part of the work flows associated with desired outcomes which are already present in the integrated project WBS and related work flows being generated by starting with the most downstream activity in said second associated work flow and working upstream until all activities in said second associated work flow have been evaluated;
      (e3) automatically removing any activity and activity dependency which are not needed as part of the work flows associated with the remaining desired outcomes for the integrated project WBS and related work flows being generated; and
      (e4) automatically removing summary activities, as appropriate, from the project WBS being generated as lowest-level activities from said second associated work flow are being removed.

3. The process of claim 1 further comprising the steps of maintaining a library of elementary activities and corresponding elementary activity dependencies, and
    using said library to determine whether any dependencies exist between an added activity and an existing activity.

4. A computerized process for generating a project work breakdown structure (WBS) and related work flows, comprising the steps of:
    (a) selecting a controlling WBS template for a project WBS;
    (b) selecting at least one desired outcome for synthesis, said at least one selected desired outcome having a first associated work flow comprising a network of interdependent activities; and
    (c) said first associated work flow with the project WBS and related work flows being generated according to said selected controlling WBS template by:
        (c1) automatically identifying the most downstream activity in said first associated work flow;
        (c2) automatically determining whether each activity in said first associated work flow is already present in the project WBS and related work flows being generated by starting with the most downstream activity in said first associated work flow and working upstream until all activities in said first associated work flow have been compared to the activities of the project WBS and related work flows being generated;
        (c3) automatically adding any activity in said first associated work flow which is not already present in the project WBS and related work flows being generated;
        (c4) automatically adding any activity dependency which should exist between any of said added activities and any activity already present in the project WBS and related work flows being generated; and
        (c5) automatically introducing summary activities, as appropriate, into the project WBS being generated when lowest-level activities from said first associated work flow are added.

5. The process of claim 4, further comprising the steps of:
    (d) selecting at least one undesired outcome reduction, said at least one selected undesired outcome having a second associated work flow comprising a network of interdependent activities; and
    (e) reduction of said second associated work flow from the project WBS and related work flows being generated by:
        (e1) automatically identifying the most downstream activity in said second associated work flow;
        (e2) automatically determining whether each activity in said second associated work flow is also part of the work flows associated with desired outcomes which are already present in the project WBS and related work flows being generated by starting with the most downstream activity in said second associated work flow and working upstream until all activities in said second associated work flow have been evaluated;
        (e3) automatically removing any activity and activity dependency which are not needed as part of the work flows associated with the remaining desired outcomes for the project WBS and related work flows being generated; and
        (e4) automatically removing summary activities, as appropriate, from the project WBS being generated by referencing said selected controlling WBS template as lowest-level activities from said second associated work flow are being removed.

6. The process of claim 4 further comprising the steps of maintaining a library of elementary activities and corresponding elementary activity dependencies, and
    using said library to determine whether any dependencies exist between an added activity and an existing activity.

* * * * *

UNITED STATES PATENT AND TRADEMARK OFFICE
CERTIFICATE OF CORRECTION

| | | |
|---|---|---|
| PATENT NO. | : 7,058,588 B2 | Page 1 of 1 |
| APPLICATION NO. | : 09/801366 | |
| DATED | : June 6, 2006 | |
| INVENTOR(S) | : Kevin W. Young and Terence Magee | |

It is certified that error appears in the above-identified patent and that said Letters Patent is hereby corrected as shown below:

In Column 7, line 23, add -- Sample Node Processing Table - 114 --.

In Column 10, line 1, add -- Sample Node Processing Table - 114 --.

In Column 11, line 32, add -- Sample Node Processing Table - 114 --.

IN THE CLAIMS

In Column 29, line 15, (claim 4, line 10), add the word -- integrating -- before the word "said".

Signed and Sealed this

Sixth Day of March, 2007

JON W. DUDAS
*Director of the United States Patent and Trademark Office*